(12) United States Patent
Li et al.

(10) Patent No.: US 12,269,139 B2
(45) Date of Patent: Apr. 8, 2025

(54) INTELLIGENT PRODUCTION LINE FOR TURNING TOOL BIT CAVITIES AND USE METHOD THEREOF

(71) Applicants: Qingdao University of Technology, Qingdao (CN); Ningbo Sanhan Alloy Material Co., Ltd., Ningbo (CN)

(72) Inventors: Changhe Li, Qingdao (CN); Haogang Li, Qingdao (CN); Liang Luo, Qingdao (CN); Weixi Ji, Qingdao (CN); Binhui Wan, Qingdao (CN); Shuo Yin, Qingdao (CN); Huajun Cao, Qingdao (CN); Bingheng Lu, Qingdao (CN); Lizhi Tang, Qingdao (CN); Xin Cui, Qingdao (CN); Mingzheng Liu, Qingdao (CN); Yanbin Zhang, Qingdao (CN); Jie Xu, Qingdao (CN); Huiming Luo, Qingdao (CN); Haizhou Xu, Qingdao (CN); Min Yang, Qingdao (CN); Huaping Hong, Qingdao (CN); Teng Gao, Qingdao (CN); Yuying Yang, Qingdao (CN); Wuxing Ma, Qingdao (CN); Shuai Chen, Qingdao (CN)

(73) Assignees: Qingdao University of Technology, Shandong Province (CN); Ningbo Sanhan Alloy Material Co., Ltd., Zhejiang Province (CN)

( * ) Notice: Subject to any disclaimer, the term of this patent is extended or adjusted under 35 U.S.C. 154(b) by 843 days.

(21) Appl. No.: 17/404,544

(22) Filed: Aug. 17, 2021

(65) Prior Publication Data
US 2022/0055164 A1 Feb. 24, 2022

(30) Foreign Application Priority Data
Aug. 19, 2020 (CN) .......................... 202010840454.5

(51) Int. Cl.
*B23Q 7/04* (2006.01)
*B23P 23/06* (2006.01)
(Continued)

(52) U.S. Cl.
CPC ................ *B23Q 7/04* (2013.01); *B23P 23/06* (2013.01); *B23Q 3/082* (2013.01); *B23Q 7/10* (2013.01);
(Continued)

(58) Field of Classification Search
CPC ......... Y10T 409/30392; Y10T 29/5124; Y10T 29/5196; Y10T 409/305264;
(Continued)

(56) References Cited

U.S. PATENT DOCUMENTS

| | | | |
|---|---|---|---|
| 7,721,398 B2 * | 5/2010 | Bernhard ................. | B23Q 1/66 409/134 |
| 8,114,001 B2 * | 2/2012 | Horn ........................ | B23Q 7/04 29/563 |

(Continued)

FOREIGN PATENT DOCUMENTS

| | | | |
|---|---|---|---|
| CN | 106112680 A | * | 11/2016 |
| CN | 206455482 U | * | 9/2017 |

(Continued)

OTHER PUBLICATIONS

Machine Translation of CN 109664147 A, which CN '147 was published Apr. 23, 2019.*

(Continued)

*Primary Examiner* — Erica E Cadugan
(74) *Attorney, Agent, or Firm* — M&B IP Analysts, LLC

(57) ABSTRACT

An intelligent production line for turning tool bit cavities and an application method are provided, which solve the problem that a production line in the prior art has low working efficiency. The intelligent production line has the (Continued)

beneficial effects of a compact arrangement structure, higher safety and improved working efficiency. The intelligent production line for turning tool bit cavities includes a robot. Material tables and at least one machining center are arranged around the robot. A transfer station used for transferring materials is arranged between the machining center and the robot. A protective fence is arranged between a position above the material tables and the robot, and between the transfer station and the robot. The robot is provided with a mechanical arm including a base plate. The base plate is provided with at least one clamping jaw and fixed with a laser detecting unit for detecting the materials.

9 Claims, 30 Drawing Sheets

(51) Int. Cl.
| | | |
|---|---|---|
| B23Q 3/08 | (2006.01) | |
| B23Q 7/10 | (2006.01) | |
| B23Q 7/14 | (2006.01) | |
| B23Q 11/08 | (2006.01) | |
| B23Q 17/24 | (2006.01) | |
| B23Q 41/02 | (2006.01) | |
| B25J 13/08 | (2006.01) | |
| B25J 19/02 | (2006.01) | |
| B23B 13/02 | (2006.01) | |
| B25J 19/00 | (2006.01) | |

(52) U.S. Cl.
CPC ........ *B23Q 7/1494* (2013.01); *B23Q 11/0891* (2013.01); *B23Q 17/2428* (2013.01); *B23Q 41/02* (2013.01); *B25J 13/089* (2013.01); *B25J 19/022* (2013.01); *B23B 13/021* (2013.01); *B23Q 7/1415* (2013.01); *B23Q 11/0825* (2013.01); *B25J 19/0058* (2013.01); *Y10S 901/49* (2013.01); *Y10T 29/5124* (2015.01); *Y10T 409/30392* (2015.01); *Y10T 409/305264* (2015.01); *Y10T 409/30532* (2015.01)

(58) Field of Classification Search
CPC ... Y10T 409/30532; Y10T 409/305376; Y10T 409/305432; Y10T 409/306048–409/306104; B23Q 11/08–11/0891; B23Q 41/00; B23Q 41/02; B23Q 7/14–7/1494; B23Q 7/04–7/048; B23Q 7/10–7/106; B23Q 2707/06; B23Q 2707/04; Y10S 29/086; Y10S 901/46–47; B23P 23/06; B25J 13/086; B25J 13/088–089; B25J 19/022
USPC ....... 409/134, 158, 159, 160, 161, 172–173; 29/DIG. 86, 563, 33 P; 901/46–47
See application file for complete search history.

(56) References Cited

U.S. PATENT DOCUMENTS

| | | | |
|---|---|---|---|
| 2016/0214805 A1* | 7/2016 | Ebihara | B23Q 11/0891 |
| 2017/0151642 A1* | 6/2017 | Suzuki | B23Q 11/0891 |

FOREIGN PATENT DOCUMENTS

| | | | | |
|---|---|---|---|---|
| CN | 109664147 | A | * | 4/2019 |
| CN | 210451004 | U | * | 5/2020 |
| CN | 112061796 | A | * | 12/2020 |
| CN | 213084559 | U | * | 4/2021 |
| DE | 3612144 | A1 | * | 10/1987 |
| DE | 102005009283 | A1 | * | 8/2006 |
| DE | 102015116729 | A1 | * | 4/2017 |
| KR | 10-2024-0107531 | A | * | 7/2024 |

OTHER PUBLICATIONS

Machine Translation of CN 106112680 A, which CN '680 was published Nov. 16, 2016.*
Machine Translation of DE 3612144 A1, which DE '144 was published Oct. 15, 1987.*

* cited by examiner

Partial section view B
3:1

Partial section view B
3:1

Partial section view C
3:1

Partial section view D
3:1

Partial section view A
3:1

Partial section view A
3:1

Partial section A
3:1

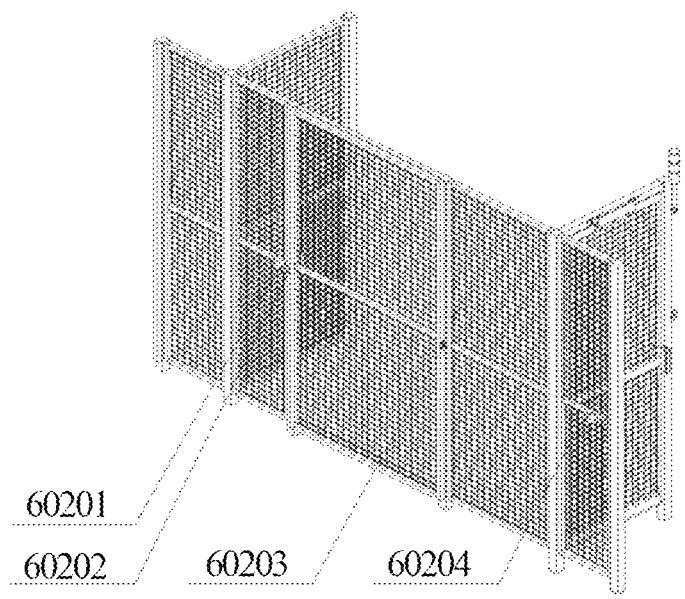

S1: Material preparation (Material table 2 $\xrightarrow{\text{Blank cutter material 1}}$ Transfer station 4 )

S2: Feeding and blanking in machining center (Transfer station 4 $\xrightarrow[\text{Finished product cutter material 1}]{\text{Blank cutter material 1}}$ Machining center 5 )

S2: Blanking (Transfer station 4 $\xrightarrow[\text{Blank cutter material 1}]{\text{Finished product cutter material 1}}$ Material table 2 )

FIG. 10

INTELLIGENT PRODUCTION LINE FOR TURNING TOOL BIT CAVITIES AND USE METHOD THEREOF

CROSS REFERENCE TO RELATED APPLICATION

This patent application claims the benefit and priority of Chinese Patent Application No. 202010840454.5 filed on Aug. 19, 2020; the disclosure of which is incorporated by reference herein in its entirety as part of the present application.

TECHNICAL FIELD

The present disclosure relates to the field of intelligent machining production lines, in particular to, an intelligent production line for turning tool bit cavities and a use method thereof.

BACKGROUND ART

The statements in this section merely provide background information related with the present disclosure and do not necessarily constitute the prior art.

For all machine tool cutters, turning tools are one kind of cutters most widely used, turning is one of the most common machining methods and used widely. With the rapid development of the manufacturing industry in China, a demand for turning tools is continuously increased. The turning tools can be divided into integral turning tools, welding turning tools, machine clamping turning tools, indexable turning tools and forming turning tools according to the structures. The indexable turning tools are increasingly widely applied, the proportion of the indexable turning tools in the turning tools is gradually increased, and a demand for cutter bars corresponding to the indexable turning tools is also remarkably increased.

According to a traditional turning tool production process in China, an operator manually places blank cutter materials into a clamp, positions and clamps the blank cutter materials according to his or her own experience, and then starts a machining center for machining. After the machining center completes one machining cycle, the operator takes away finished product materials and then places the blank materials into the machining center, and control the machining center to machine the materials, and so on. Due to the fact that the operator positions and clamps the blank cutter materials according to his or her own experience, the quality of machined cutters is poor. Along with the continuously increasing demand of turning tools and the continuous increase of labor cost, the traditional turning tool production mode is time-consuming and labor-consuming, and it hinders the improvement of production efficiency and economy severely; and even when the operator is in direct contact with a machine tool, a problem of personal safety may be caused by an abnormal operation. As the automatic production line technology is continuously improved and the labor cost is continuously increased, a production line composed of a robot and a machining center is mostly adopted to machine turning tools at present; in this way, although the problems said above are improved, they are not completely solved. The current production line related to machining turning tools mainly has the following disadvantages:

(1) The production line can only machine cutter materials of one type, and relevant mechanisms need to be replaced if other types of cutter materials need to be machined.

(2) When the operator loads and unloads materials, the waiting time of the production line is too long. The efficiency of the single-time loading and unloading of the materials by the operator is low. During manual loading and unloading of the materials, the operator is too close to the machine and a protection measure is lacked, thereby easily causing the personal safety. The robot working area is not isolated from the operator working area, which may cause an accident easily.

(3) When one machining center is abnormal and maintained by the operator, the whole production line is stopped.

(4) Before machining, the production line cannot detect whether the positioning and clamping of the materials are reliable or not, and the product quality cannot be guaranteed.

(5) The production line does not have a compact structure. For the production line, the space is seriously wasted.

Loading and unloading equipment with one robot corresponding to three machine tools is invented by Yin Ronghao in Guangdong Borunte Intelligent Equipment Co., Ltd. The loading and unloading equipment includes a rack, a robot and three machine tools, an end of each of the three machine tools is open. The upper surface of the rack is fixedly connected with a rack plate matched with the rack. The upper surface of the rack plate is fixedly connected with two product positioning plates. A six-axis industrial robot is adopted to utilize a jig to grab blank materials on the positioning plates, and move the blank materials to the positions of the machine tools, takes out finished products, and place the blank materials to be machined into the machine tools for machining so as to complete loading and unloading operations, instead of manual operation, and one robot loads the materials to the three machine tools for machining.

Although the loading and unloading equipment solves the problems that manual production is tedious, and has a low efficiency, a high labor intensity and the like, the production line does not have a detection function, the machining quality of the blank materials cannot be guaranteed, and the whole production line can only machine specific types of blank materials.

A numerical control machine tool machining automatic production line is invented by Wu Guangming, etc. in Dongguan High-skilled public training center. The numerical control machine tool machining automatic production line includes a six-axis robot, a material clamp fixed to a robot arm of the six-axis robot, three numerical control machine tools and three material machine tools around the robot. The material machine tools are in front of the robot. The three numerical control machine tools and the three material machine tools are symmetrically pairwise and are vertically distributed around the six-axis robot, the six-axis robot is provided with the 360-degree rotating robot arm, and the 360-degree rotating robot arm can grab parts to be machined located on the material machine tools to the three numerical control machine tools.

Although the production line improves the processing efficiency of products, saves the labor cost and reduces the occurrence rate of safety accidents, material trays on the material platform can only convey characteristic types of materials. The trays need to be replaced if other types of materials need to be machined, and in the machining process, the production line does not have a detection function, so that the production quality of the production line cannot be guaranteed.

In conclusion, the inventor discovers that the current related production line for producing turning tools is imperfect and has the following defects: the production line has a single production type and no good man-machine interaction and cannot ensure personal safety of the operator and detect whether the positioning and clamping of materials are reliable or not, and the like.

SUMMARY

In view of the defects in the prior art, the present disclosure aims to provide an intelligent production line for turning tool bit cavities, the production line has a compact structure, reduces space waste, and protects production efficiency of the production line to the maximum extent.

In order to achieve the above purpose, the present disclosure provides the following technical solution.

An intelligent production line for turning tool bit cavities includes a robot. Material tables and at least one machining center are arranged around the robot. A transfer station for transferring materials is arranged between each machining center and the robot. A protective fence is arranged between a position above the material tables and the robot, and between the transfer station and the robot, the robot is provided with a mechanical arm, the mechanical arm includes a base plate, the base plate is provided with at least one clamping jaw and fixed with a laser detecting unit for detecting materials.

The intelligent production line for turning tool bit cavities is provided. The protective fence is rectangular. The robot is located at a center position of the protective fence. The at least one machining center includes three machining centers, and the material tables and the three machining centers are annularly and uniformly arranged along a circumferential direction with the robot as a circle center.

The protective fence includes three forbidden doors and a protective guard arranged above the material tables. Each forbidden door includes an opening and closing door which is openable, the opening and closing door is engaged with a forbidden door socket fixed to the forbidden door through a forbidden door bolt to achieve opening and closing of the opening and closing door. Two safety doors are arranged on each side of the protective fence, the two safety doors are arranged on two sides of the opening and closing door of each forbidden door respectively, one of the two safety doors is a fixed door, and another one of the two safety doors is opened.

The forbidden doors can isolate an abnormal machining center from the whole production line. When an operator maintains the abnormal machining center, the robot can continue to perform operations on other normal machining centers, without shutdown of the whole production line. Furthermore, the forbidden doors isolate an operator maintenance area from a robot working area to ensure personal safety of the operator during maintenance. The safe doors can isolate a manual working area from the robot working area, the three safety doors and the robot are connected in series, the robot stops working after the safety doors are opened, and a magnetic lock is mounted on the safety door in order to prevent the safety door from being opened accidentally.

The mechanical arm is further provided with an air nozzle on the base plate for spraying high-pressure gas, the air nozzle is mounted through the base plate, and an orientation of the air nozzle is same as an orientation of a part of the at least one clamping jaw.

The laser detecting unit includes a laser detector fixed to a bottom mounting plate, the bottom mounting plate is connected with a dustproof end cover through a pin shaft. A first linear moving mechanism is arranged on a side of the laser detector and connected with an ejector rod. The ejector rod is arranged on an inner side of the dustproof end cover, and the ejector rod is configured to extend out to open the dustproof end cover.

The intelligent production line for turning tool bit cavities is provided. A seal cover with a U-shaped longitudinal cross section is arranged on an outer side of the laser detector, and reset springs are arranged between two sides of the dustproof end cover and a side portion of the seal cover as well as a side portion of the first linear moving mechanism respectively. After a detection is completed, the linear moving mechanism is retracted, the dustproof end cover is closed under the action of the reset springs. The first linear moving mechanism includes a cylinder, and a reaction of the whole process is quicker through the cooperation of cylinder transmission and the reset springs in the detection process, thereby improving the detection efficiency remarkably and avoiding a lens of the laser detector from being polluted.

According to the intelligent production line for turning tool bit cavities, the material table includes a material table base body, the material table base body supports an upper-layer tray push-pull module and a lower-layer tray push-pull module, the upper-layer tray push-pull module is higher than the lower-layer tray push-pull module, and the upper-layer tray push-pull module and the lower-layer tray push-pull module move in a staggered mode.

The upper-layer tray push-pull module includes an upper-layer tray, the upper-layer tray is fixed to an upper-layer supporting plate. Two sides of the upper-layer supporting plate are fixed to sliding blocks of guide rails through upper-layer connecting blocks respectively. The upper-layer connecting blocks are connected with a second linear moving mechanism arranged on a side portion of one of the guide rails. The second linear moving mechanism is a cylinder. The guide rails are supported through an upper-layer tray push-pull module frame which is provided with buffer cylinders at ends of the guide rails. The upper-layer tray push-pull module frame is made of Aluminum profile frame. Proximity sensors are arranged at two stop extreme positions of the second linear moving mechanism so that position information of the upper-layer tray can be timely transmitted to a computer, and the computer is provided with a display screen so as to be convenient for the operator to check.

The intelligent production line for turning tool bit cavities is provided. The lower-layer tray push-pull module includes a lower-layer tray, the lower-layer tray is fixed to a lower-layer supporting plate. The lower-layer supporting plate is fixed to sliding blocks of the guide rails through lower-layer connecting blocks. A lower surface of the lower-layer supporting plate is connected with a third linear moving mechanism through a connecting piece. The third linear moving mechanism is a cylinder and arranged below the lower-layer supporting plate. The third linear moving mechanism is located between the guide rails on two sides below the lower-layer tray. The guide rails are supported through a lower-layer tray push-pull module frame which is provided with buffer cylinders at the ends of the guide rails; the lower-layer tray push-pull module frame is an aluminum profile frame.

The connecting piece includes a T-shaped connecting plate connected with the lower-layer supporting plate and a U-shaped connecting plate fixed to a piston rod of the third linear moving mechanism, and the T-shaped connecting plate and the U-shaped connecting plate are connected with each other.

Proximity sensors are arranged at two stop extreme positions of the cylinder body, so that position information of the lower-layer tray can be timely transmitted to the computer so as to be convenient for the operator to check.

According to the intelligent production line for turning tool bit cavities, the transfer station includes a transfer station base body, a plurality of supporting plates are arranged on an upper surface of the transfer station base body, and a transfer tray which is obliquely arranged is mounted through the supporting plates with different heights. The transfer station converts a material exchange between the machining center and the material tables into a material exchange between the transfer station and the material tables, thereby greatly reducing the waiting time of the machining center in the loading and unloading process and improving the production efficiency of the production line. The transfer tray is obliquely arranged. When the robot clamps the cutter materials in the transfer tray subsequently, the cutter materials can be automatically subjected to secondary positioning under action of gravity, which not only avoids repeated detection by the laser detection module, but also improves the stability and reliability of clamping the cutter materials by the clamping jaws.

Different types of material positioning grooves are formed in the upper-layer tray, the lower-layer tray and the transfer tray respectively, the material positioning grooves are arranged in a stepped manner, space six-degree-of-freedom of cutter materials with different specifications is completely limited in a production process, and the cutter materials with different specifications are machined through the production line.

According to the intelligent production line for turning tool bit cavities, the machining center is a machining tool. The machining tool is provided with protective doors, a plurality of proximity sensors are arranged on one side of each of the protective doors of the machining tool. The proximity sensors are arranged at extreme positions of the protective doors on two sides. A fourth linear moving mechanism and a fifth linear moving mechanism are connected with the protective doors on the two sides respectively, the fourth linear moving mechanism and the fifth linear moving mechanism both select cylinders, and the protective doors are driven to be opened and closed through the fourth linear moving mechanism and the fifth linear moving mechanism.

According to the intelligent production line for turning tool bit cavities, the machining center is provided with a multi-station gas detection hydraulic clamp. The multi-station gas detection hydraulic clamp includes a base plate, a tool setting gauge is arranged on one side of the base plate, a supporting plate is arranged through the base plate, the supporting plate can be provided with a plurality of positioning tables, and an end face clamping mechanism and an upper clamping mechanism are mounted on the positioning tables. The upper clamping mechanism is mounted in a zigzag groove in the supporting plate at an angle of 45 degrees relative to the supporting plate, and the upper surfaces and the side faces of the cutter materials can be clamped simultaneously, thereby improving the clamping efficiency and the production efficiency. The positioning tables can completely limit the space six-degree-of-freedom of the cutter materials to achieve reliable positioning, and the cutter materials can be reliably positioned and clamped through the cooperation of the positioning tables, the end face clamping mechanism and the upper clamping mechanism.

A plurality of gas detection pipelines are arranged in the multi-station gas detection hydraulic clamp, and gas outlet holes of the gas detection pipelines are all formed in the positioning tables. When the cutter materials are in a good positioning and clamping state on the clamp, the gas outlet holes in the positioning tables are blocked by the cutter materials, and an air pressure is generated in each gas detection pipeline. The gas detection pipeline is provided with a pressure sensor, the pressure sensor is connected with the controller of the machining center and the computer respectively. The computer and the controller of the machining center detect the gas pressure in the gas detection pipeline so as to judge whether the cutter materials are reliably positioned and clamped by the clamp or not. A plurality of stations on the clamp can be used for reliably positioning, clamping and detecting a plurality of cutter materials simultaneously, thereby improving the production efficiency of the production line and ensuring the production quality of the production line. Before machining, the tool setting gauge is used for detecting the state of the cutter so as to ensure the machining quality of the production line.

The multi-station gas detection hydraulic clamp is connected with the computer, and also connected with a foot switch arranged on the ground. The multi-station gas detection hydraulic clamp can not only be automatically opened and closed by the computer (a switch arranged on the gas detection pipeline is connected with the computer), but also be manually opened and closed through the foot switch arranged on the ground.

In the second aspect, a use method of the intelligent production line for turning tool bit cavities is further disclosed, including the following steps:

setting a plurality of blank materials on the material tables, and loading the materials to the robot by the material tables;

conveying the blank materials on the material tables to the transfer station at each machining center through the mechanical arm for temporary storage by the robot;

exchanging finished product materials in the machining center with the blank materials on the transfer station by the robot, after the machining center completes a machining cycle for current blank materials therein;

carrying out a new round of machining by the machining center after the exchanging is completed; and exchanging the finished product materials on the transfer station and the blank materials on the material tables by the robot in a machining process of the machine center and outputting the finished product materials from the material tables after the finished product materials stored on the material tables reach a specified number.

The disclosure has the following beneficial technical effects.

Firstly, all parts of the intelligent production line are annularly and uniformly arranged along a circumferential direction with the robot as a circle center, the production line has a compact structure and a high operation efficiency.

Secondly, the protective fences of the present disclosure can isolate the manual working area from the robot working area so as to protect personal safety of the operator to the maximum extent, and isolates the abnormal machining center from the production line so as not to affect continuous operation of other parts of the production line.

Thirdly, different types of material positioning grooves are formed in the lower-layer tray, the upper-layer tray and the transfer tray respectively, so that the space six-degree-of-freedom of cutter materials with different specifications can be completely limited so as to reliably convey the cutter materials with the different specifications.

Fourthly, the double-layer structure for material table grooves can alternately load the materials to the robot, which can remarkably reduce the waiting time of the robot and improve the working efficiency of the production line;

The material tables are driven by the cylinders, work and respond quickly. The proximity sensors are mounted on the cylinders and can detect the positions of the upper and lower trays. Control buttons are mounted on the material table base bodies, and the operator interacts with the robot through the buttons.

Fifthly, the laser detecting unit, the clamping jaws and the air nozzle are mounted on the robot. The laser detecting unit detects the positions of the cutter materials before the cutter materials are clamped, thereby improving reliability of clamping. The laser detecting unit adopts cylinder transmission which is cooperated with the reset springs, so that the whole detection process is quicker so as to avoid the lens of the laser detector from being polluted, thereby improving the detection efficiency. The air nozzle is used for cleaning smear metal on the positioning tables so as to ensure accurate positioning of the cutter materials.

Sixthly, the cylinder and the proximity sensors are mounted on the machining center. The cylinder is responsible for opening and closing the protective doors of the machining center, and the proximity sensors feedback the opening and closing states of the protective doors of the machining center to the computer in time. The foot switch is further arranged in front of the machining center, and the opening and closing of the multi-station gas detection hydraulic clamp can be controlled through the foot switch when the operator maintains the multi-station gas detection hydraulic clamp.

Seventhly, the multi-station gas detection hydraulic clamp adopted in the machining center can position and clamp a plurality of cutter materials simultaneously and detect the positioning and clamping states of the cutter materials. Furthermore, the upper clamping mechanism is mounted at an angle of 45 degrees, so that two faces of the cutter material can be clamped simultaneously, thereby ensuring machining quality of the production line without manual operation while improving the positioning and clamping efficiency. The end face clamping mechanism and the upper clamping mechanism both belong to hinge clamping mechanisms, and have a simple structure, a rapid action, a large force increasing ratio and a low friction loss.

Eighthly, the transfer station is used for transferring the materials, so that the waiting time of the machining center for loading and unloading the materials is saved, the materials can be positioned for a second time, thereby avoiding repeated detection by the laser detection module.

Ninthly, in order to protect personal safety of the operator, the three safety doors and the robot are connected in series, and a magnetic lock is mounted on the safety door in order to prevent the safety door from being opened accidentally.

Tenthly, when the abnormal machining center is maintained by the operator, the abnormal machining center can be isolated from the whole production line by the forbidden doors. The robot can perform operations on other normal machining centers, it is no necessary to shut down the whole production line, which protects the production efficiency of the production line to the maximum extent. Meanwhile, the forbidden doors isolate the operator maintenance area from the robot working area to ensure personal safety of the operator during maintenance.

BRIEF DESCRIPTION OF THE DRAWINGS

Accompanying drawings of the description which form a part of the present disclosure are used for providing further understanding of the present disclosure, and the illustrative embodiments and description thereof in the present disclosure are used for explaining the present disclosure and are not to be construed as a limitation to the present disclosure.

FIG. 5(*l*) is an axonometric drawing of a line concentration box;

FIG. 5(*m*) is an axonometric drawing of a nozzle;

FIG. 6(*a*) is an explosive view of the transfer station;

FIG. 6(*b*) is a top view of the transfer station;

FIG. 6(*c*) is a section view of FIG. 6(*b*) along section A-A;

FIG. 6(*d*) is an axonometric drawing of a transfer tray;

FIG. 7(*a*) is an axonometric drawing when the protective door of the machining center is opened;

FIG. 7(*b*) is an axonometric drawing of a proximity sensor mounted on a machining axis;

FIG. 7(*c*) is an axonometric drawing of a foot switch;

FIG. 8(*a*) is an explosive view of the multi-station gas detection hydraulic clamp;

FIG. 8(*b*) is an axonometric drawing of a tool setting gauge;

FIG. 8(*c*) is an assembling axonometric drawing of a positioning table and an end face clamping mechanism;

FIG. 8(*d*) is an axonometric drawing of an upper clamping mechanism;

FIG. 8(*e*) is a partial section view showing a connected relationship of the tool setting gauge and a base plate;

FIG. 8(*f*) is a partial section view showing a connected relationship of the base plate and a supporting plate;

FIG. 8(*g*) is a partial section view showing a connected relationship of the positioning mechanisms and the supporting plate;

FIG. 8(*h*) is a partial section view showing a connected relationship of the upper clamping mechanism and the supporting plate;

FIG. 8(*i*) is a partial enlarged drawing of part A in FIG. 8(*h*);

FIG. 9(*a*) is an axonometric drawing of a safety door;

FIG. 9(*b*) is another axonometric drawing of the safety door;

FIG. 9(*c*) is a partial enlarged drawing of part A in FIG. 9(*b*);

FIG. 9(*d*) is an axonometric drawing of a safety door bolt;

FIG. 9(*e*) is an axonometric drawing of a safety door socket;

FIG. 9(*f*) is an axonometric drawing of a forbidden door socket;

FIG. 9(*g*) is an axonometric drawing showing a forbidden door in an open state;

FIG. 9(*h*) is an axonometric drawing showing the forbidden door in a closed state; and FIG. 10 is a work flow diagram of the production line.

Figure 1:
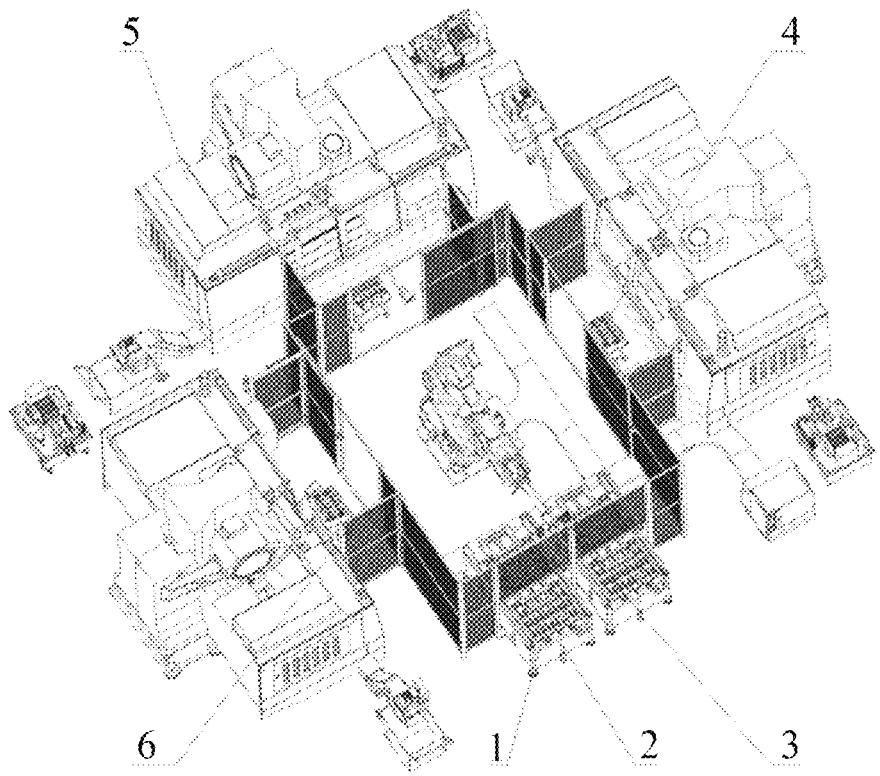
FIG. 1 is an axonometric drawing of an intelligent production line for machining turning tool bit cavities with different types.
Figure 2:
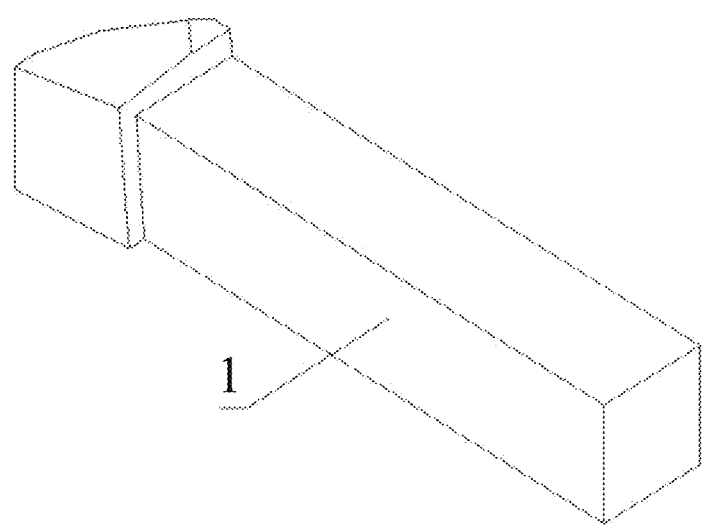
FIG. 2 is an axonometric drawing of a cutter material.

List of reference numbers: 1 cutter material; 2 material table; 3 robot; 4 transfer station; 5 machining center; 6 protective fence;

201 material table base body; 202 lower-layer tray push-pull module; 203 upper-layer tray push-pull module;

301 base plate; 302 laser detecting unit; 303 hexagon socket head cap screw; 304 clamping jaw; 305 hexagon socket head cap screw; 306 line concentration box; 307 hexagon socket head cap screw; 308 hexagon washer head tapping screw; 309 air nozzle;

401 transfer station base body; 402 supporting plate; 403 hexagon socket head cap screw; 404 hexagon socket head cap screw; 405 transfer tray; 40501 transfer material groove; 40502 transfer material groove; 40503 transfer material groove; 406, supporting plate;

501 machining center shell; 502 proximity sensor; 503 cylinder; 504 multi-station gas detection hydraulic clamp; 505 L-shaped connecting block; 506 foot switch; 507 square connecting block; 508 L-shaped connecting block; 509 square connecting block; 510 hydraulic station; 511 cylinder; 512 buzzing signal lamp; 513 proximity sensor; 514 L-shaped trigger block; 515 proximity sensor; 516 proximity sensor; 517 L-shaped trigger block;

601 safety door; 602 forbidden door;

20101 supporting block; 20102 control button; 20103 control button; 20201 hexagon socket head cap screw; 20202 hexagon socket head cap screw; 20203 lower-layer tray; 2020301 lower-layer material groove; 2020302 lower-layer material groove; 2020303 lower-layer material groove; 20204 lower-layer supporting plate; 20205 hexagon socket head cap screw; 20206 lower-layer connecting block; 20207 hexagon socket head cap screw; 20208 buffer cylinder; 20209 hexagon socket head cap screw; 20210 hexagon washer head tapping screw; 20211 hexagon socket head cap screw; 20212 hexagon nut; 20213 spring washer; 20214 U-shaped connecting plate; 20215 shaft sleeve; 20216 triangular connecting block; 20217 hexagon socket head cap screw; 20218 T-shaped connecting plate; 20219 guide rail; 20220 proximity sensor; 20221 sliding block; 20222 proximity sensor; 20223 cylinder mounting base; 20224 hexagon socket head cap screw; 20225 hexagon socket head cap screw; 20226 cylinder mounting support; 20227 aluminum profile frame; 20228 cylinder; 20301 aluminum profile frame; 20302 upper-layer supporting plate; 20303 hexagon socket head cap screw; 20304 hexagon nut; 20305 spring washer; 20306 cylinder connecting plate; 20307 shaft sleeve; 20308 right-angle connecting plate; 20309 proximity sensor; 20310 hexagon socket head cap screw; 20311 cylinder; 20312 proximity sensor; 20313 cylinder mounting base; 20314 hexagon socket head cap screw; 20315 cylinder mounting support; 20316 hexagon socket head cap screw; 20317 upper-layer tray; 2031701 upper-layer material groove; 2031702 upper-layer material groove; 2031703 upper-layer material groove; 20318 hexagon socket head cap screw; 20319 hexagon socket head cap screw; 20320 hexagon socket head cap screw; 20321 upper-layer connecting block; 20322 sliding block; 20323 guide rail; 20324 hexagon socket head cap screw; 20325 buffer cylinder;

30201 dustproof end cover; 30202 knurled screw; 30203 pin shaft seat; 30204 hexagon socket head cap screw; 30205 hexagon socket head cap screw; 30206 laser detector; 30207 bottom mounting plate; 30208 rear end mounting plate; 30209 hexagon socket head cap screw; 30210 hexagon socket head cap screw; 30211 first linear moving mechanism; 30212 reset spring; 30213 seal cover; 30214 hexagon socket head cap screw;

50401 tool setting gauge; 50402 base plate; 50403 supporting plate; 50404 end face clamping mechanism; 50405 positioning table; 50406 upper clamping mechanism; A-E gas outlet hole;

60101 iron plate; 60102 magnetic lock; 60103 beep signal lamp; 60104 electromagnetic switch; 60105 safety door socket; 60106 safety door bolt; 60201 forbidden door socket; 60202 forbidden door bolt; 60203 forbidden door bolt; 60204 forbidden door socket;

3021101 round-head ejector rod; 3021102 hexagon socket head cap screw; 3021103 round-head ejector rod shell; 3021104 cylinder piston rod; 3021105 cylinder block;

5040401 pin seat; 5040402 connecting rod; 5040403 V-shaped clamping block; 504040404 clamping arm; 5040405 piston rod; and 5040401 hydraulic cylinder block.

DETAILED DESCRIPTION OF THE EMBODIMENTS

It should be noted that the following detailed description is exemplary and aims to provide further description for the present disclosure. Unless otherwise specified, all techniques and scientific terms used in the present disclosure have same meanings generally understood by ordinary skilled persons in the art in the present disclosure.

It needs to be noted that the terms used herein just describe the specific implementations, but not expect to limit the exemplary implementations according to the disclosure. It is to be understood that the singular forms "a", "an", and "the" include plural referents unless the context clearly dictates. Moreover, it should be understood that the terms "contain" and/or "comprise" used in the specification indicate characteristics, steps, operations, devices, assemblies and/or their combination.

For ease of description, the terms "upper", "lower", "left" and "right", if appearing in this application, are only meant to be consistent with the upper, lower, left and right directions in the attached drawings, and do not limit the structure, just for facilitating the description of the present disclosure and simplifying the description, but not for indicating or hinting that the indicated device or element must be in a specific direction and is constructed and operated in the specific direction, so that the terms cannot be understood as the restriction of the present disclosure.

Explanation of terms: the terms "mount", "link", "connect", "fix" and the like in this application are to be understood broadly; for example, the components can be fixedly connected, and also can be detachably connected or integrally connected; the components can be connected mechanically, or connected electrically; the components can be directly connected, also can be indirectly connected through an intermediate, and can be communicated internally; or they means mutual interaction relationship between two components. The specific meanings of the above terms in the present disclosure will be understood by those skilled in the art as appropriate.

As the background technology introduces, in order to solve the technical problem that the development of a turning tool production line is not perfect enough in the prior art, the present disclosure provides an intelligent production line for turning tool bit cavities.

In a typical embodiment of the present disclosure, as shown in FIG. 1, the intelligent production line comprises material tables 2, a robot 3, transfer stations 4, machining centers 5 and protective fences 6. The machining centers are used for machining cavities of cutters. The material tables 2 and the three machining centers 5 are annularly and uniformly arranged along a circumferential direction with the robot 3 as a circle center. An overall frame of the protective fence 6 is of a rectangular, a safety door 601 and a forbidden door 602 are arranged on each of three adjacent side fences of the protective fence 6, and the safety door 601 and the forbidden door 602 of each side fence are perpendicular to each other. The robot 3 is arranged at a central position of the protective fence 6. The transfer stations 4 and the machining centers 5 are arranged right in front of the outer sides of the three forbidden doors 602 of the protective fence 6, and a transverse gap distance between the machining center 5 and a corresponding safety door 601 is provided such that a operator cannot operate the machining center 5 through the transverse gap distance. Each machining center 5 corresponds to the adjacent transfer station 4 in front of the safety door corresponding to the machining center 5, each transfer station is closer to the robot 3 than the machining center 5. A linear distance between each transfer station 4 and the machining center 5 corresponding to this transfer station 4 is the same and is a fixed value. A linear distance between the robot 3 and each transfer station 4 or each machining center 5 is equal and is a fixed value. Two material tables 2 are arranged on the side fence of the protective fence 6 without the safety door 601 and the forbidden door 602 4 and used for providing materials for the production line, and the number of the material tables 2 is not limited to two and can be one, three or even more.

The transverse distance between the machining center 5 and the corresponding safety door 601 is provided such that the operator cannot operate the machining center 5 through the transverse distance. A manual working area and a robot working area can be isolated from each other through the protective fence 6 to protect the personal safety of the operator to the maximum extent. An abnormal machining center can be isolated from the production line, without affecting normal operations of the remaining parts of the production line. The transfer stations 4, the machining centers 5 and the material tables 2 are all annularly and uniformly arranged along the circumferential direction with the robot 3 as the circle center, which can obviously improve working efficiency of the robot 3 for the transfer stations 4, the machining centers 5 and the material tables 2.

Figure 3:
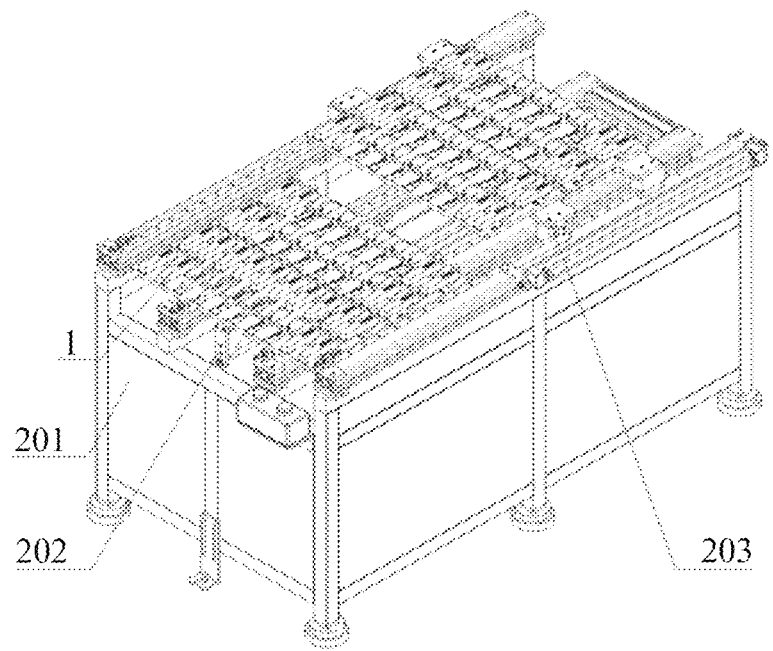
FIG. 3 is an axonometric drawing of a material table.
Figure 3A:
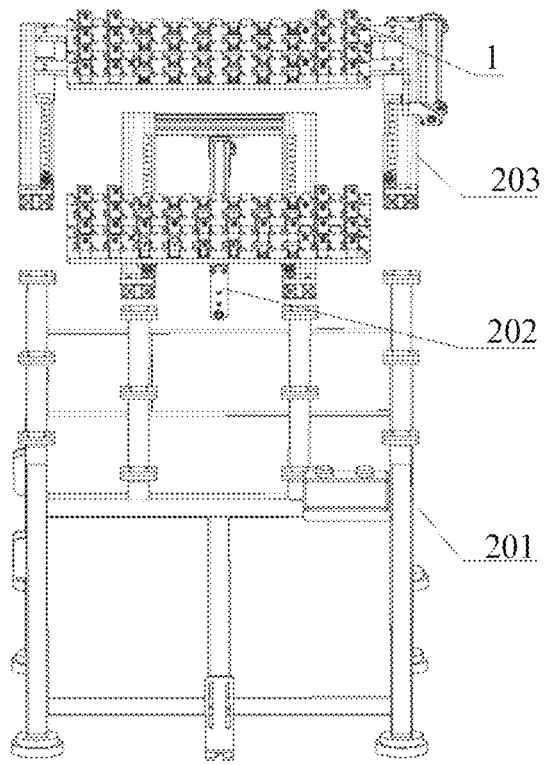
FIG. 3(a) is an explosive view of the material table.
Figure 3B:
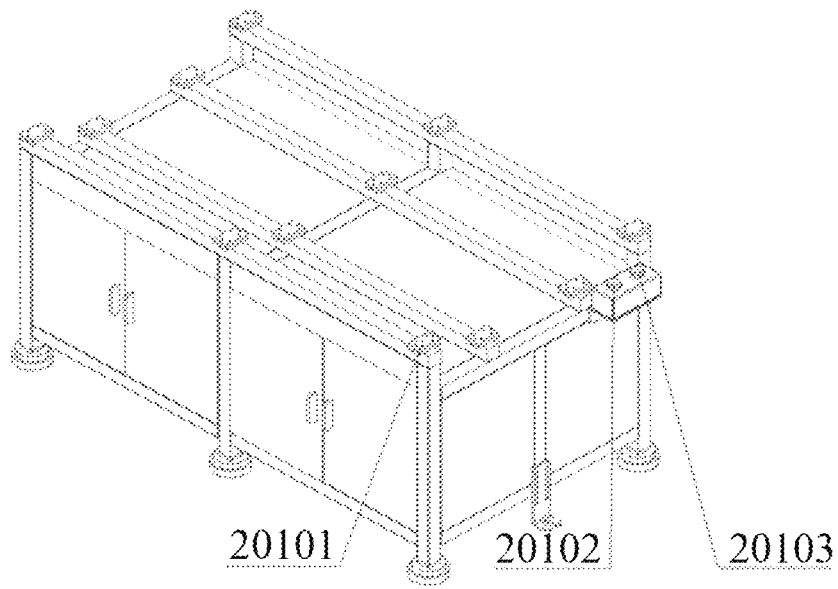
FIG. 3(b) is an axonometric drawing of a material table base body.
Figure 3C:
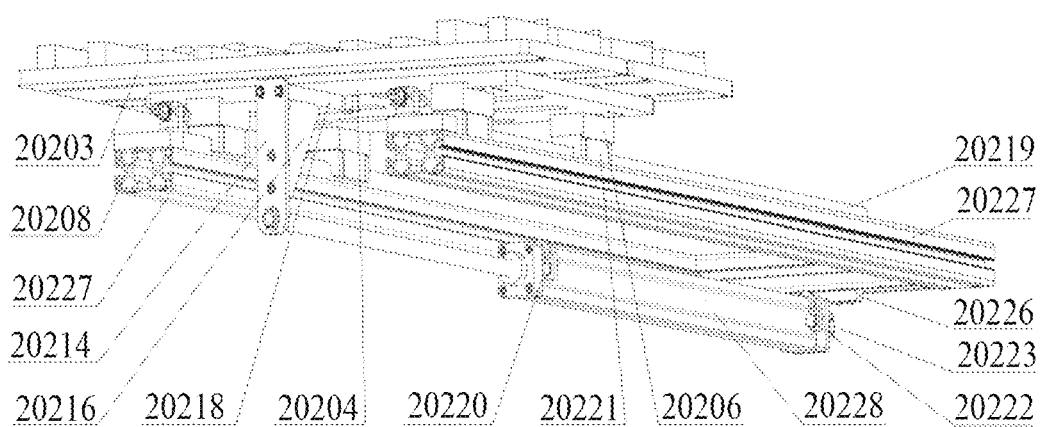
FIG. 3(c) is an axonometric drawing of a lower-layer tray push-pull module.
Figure 3D:
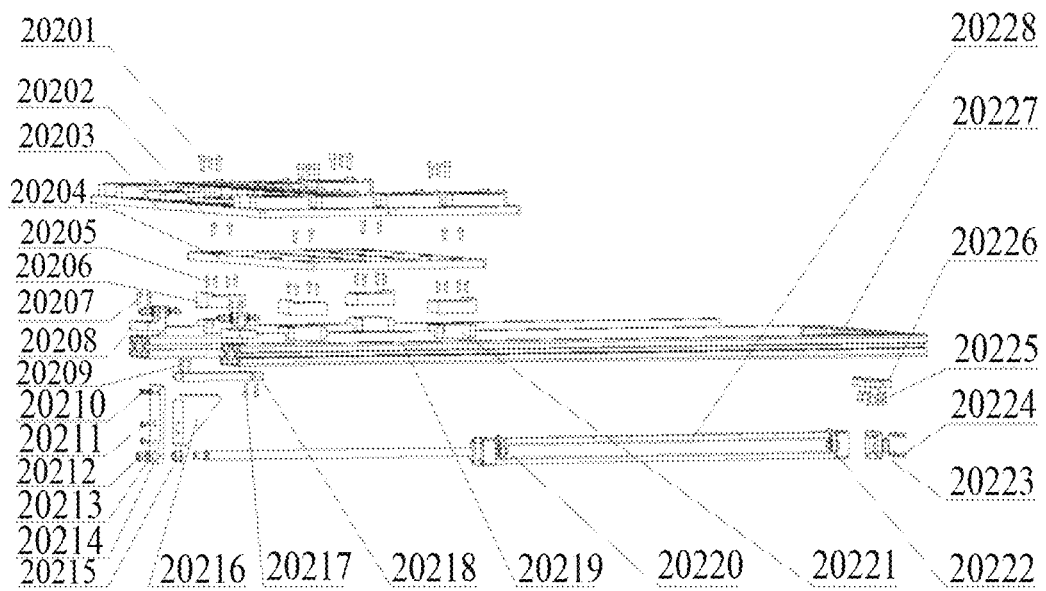
FIG. 3(d) is an explosive view of the lower-layer tray push-pull module.
Figure 3E:
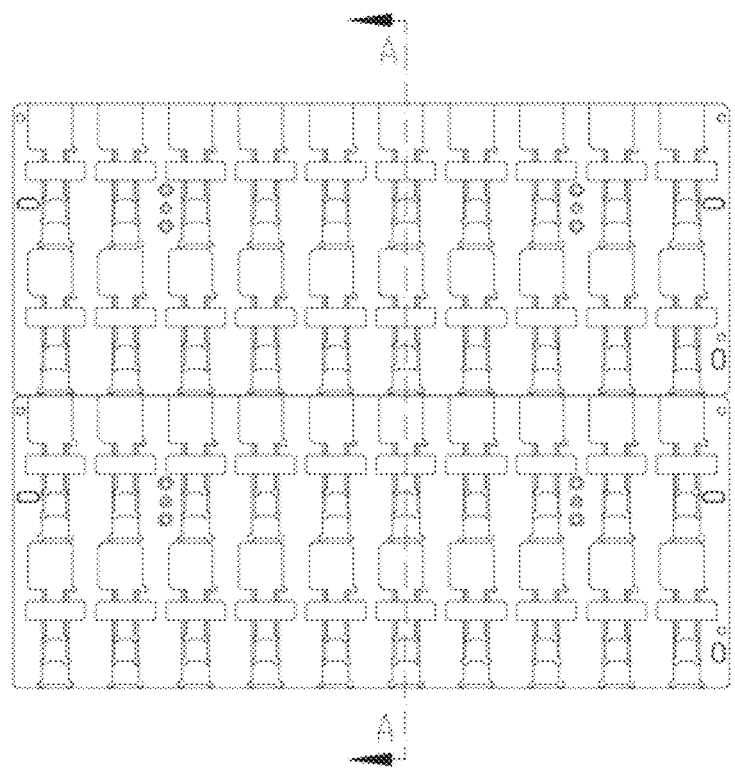
FIG. 3(e) is a top view of a lower-layer tray.
Figure 3F:
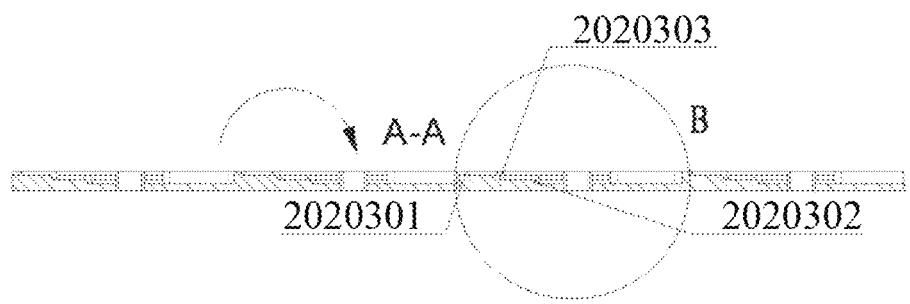
FIG. 3(f) is a section view of FIG. 3(e) along section A-A.
Figure 3G:
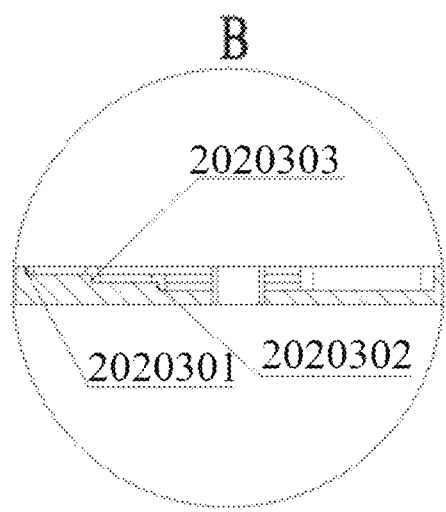
FIG. 3(g) is a partial enlarged drawing of part B in FIG. 3(f)
Figure 3H:
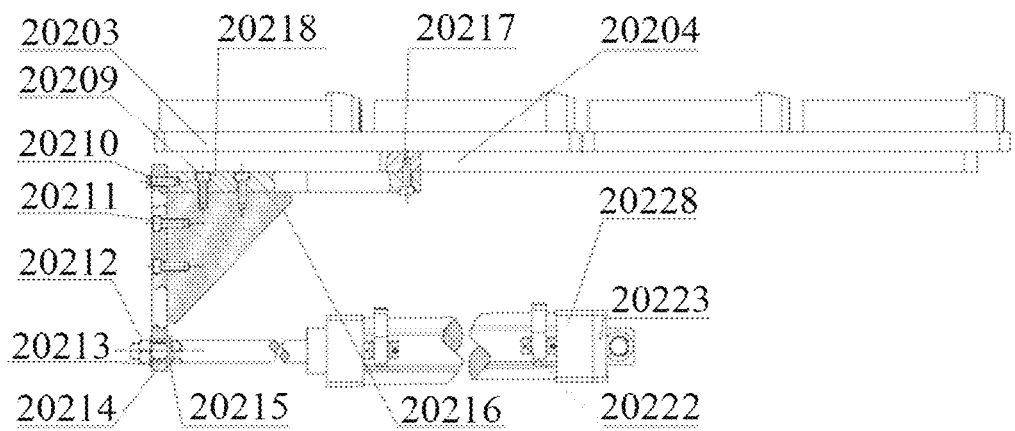
FIG. 3(h) is a partial section view showing a connected relationship among core components in the lower-layer tray push-pull module.

Referring to the material table 2 as shown in FIG. 3 to FIG. 3(a), the material table includes a material table base body 201, a lower-layer tray push-pull module 202 and an upper-layer tray push-pull module 303. Supporting blocks 20101 are welded to the material table base body 201, the lower-layer tray push-pull module 202 and the supporting block 20101 are fixed together through welding, the upper-layer tray push-pull module 203 is welded to the supporting block 20101. The supporting blocks used for supporting the upper-layer tray push-pull module 203 and the supporting blocks used for supporting the lower-layer tray push-pull module 202 are arranged at different heights. After the upper-layer tray push-pull module and the lower-layer tray push-pull module are installed, the upper-layer tray push-pull module 203 is located above the lower-layer tray push-pull module 202. The upper-layer tray push-pull module 203 and the lower-layer tray push-pull module 202 do not interfere with each other in the working process and are both driven by cylinders, and they can carry a larger number of materials, be operated fast and have rapid response, thereby improving the production efficiency of the production line. Control buttons 20102 and 20103 are further mounted on the material table base body 201. The operator sends a signal of completing placement of the materials to the robot 3 through the control buttons, and then the robot 3 controls the cylinders to pull back blank materials (close to the robot 3) for operation according to the signal, so that good man-machine interaction of the production line is realized.

In the lower-layer tray push-pull module 202 as shown in FIGS. 3(b) to 3(h), the lower-layer tray 20203 and a lower-layer supporting plate 20204 are connected through hexagon socket head cap screws 20201. A plurality of material grooves are formed in the lower-layer tray 20203, the material grooves are arranged according to predetermined rules and used for arranging cutter materials. An inner side portion of each material groove is in a step shape so as to be suitable for different sizes of cutters, and therefore the material grooves includes lower-layer material grooves 2020301, lower-layer material grooves 2020302 and lower-layer material grooves 2020303.

The lower-layer supporting plate 20204 is fixed onto lower-layer connecting blocks 20206 through hexagon socket head cap screws 20202. The lower-layer connecting blocks 20206 are fixedly connected with sliding blocks 20221 through hexagon socket head cap screws 20205. Guide rails 20219 are mounted on an aluminum profile frame 20227 through screws. The upper end of a U-shaped connecting plate 20214 and the front end of a T-shaped connecting plate 20218 are connected through hexagon washer head tapping screws 20210 and are perpendicular to each other. The triangular connecting block 20216 is connected with the U-shaped connecting plate 20214 and the T-shaped connecting plate 20218 through hexagon socket head cap screws 20211 and hexagon socket head cap screws 20209. The triangular connecting block 20216 can greatly improve the bearing capacity of the U-shaped connecting plate 20214 and the T-shaped connecting plate 20218. A threaded part at the top end of a piston rod of a cylinder 20228 penetrates through a shaft sleeve 20215, the bottom end of the U-shaped connecting plate 20214, a spring washer 20213 and a hexagon nut 20212 to be screwed, and the piston rod of the cylinder 20228 is connected with the U-shaped connecting plate 20214 through a connected relationship. The rear end of the T-shaped connecting plate 20218 is fixed to the bottom of the lower-layer supporting plate 20204 through hexagon socket head cap screws 20217.

A cylinder mounting base 20223 is fixed at the bottom of the cylinder 20228 through hexagon socket head cap screws 20224. A cylinder mounting support 20226 is fixed at the bottom of the aluminum profile frame 20227 through hexagon socket head cap screws 20225. After the installation is completed, the cylinder 20228, the T-shaped connecting plate 20218, the aluminum profile frame 20227, the guide rails 20219, the lower-layer tray 20203 and the lower-layer supporting plate 20204 are parallel to one another. The lower-layer tray 20203 is driven by the cylinder 20228 to reciprocate along the direction of the guide rails 202-19. A buffer cylinder 20208 is mounted at one end of the aluminum profile frame 20227 through hexagon socket head cap screws 20207, the mounted buffer cylinder 20208 is located at an extreme position which the lower-layer tray can reach when the lower-layer tray 20203 is pushed out, the buffer cylinder 20208 can limit the conveying position of the lower-layer tray 20203, buffer and absorb shock from the lower-layer tray, and the lower-layer tray 20203 is guaranteed to be accurately positioned in the working process.

Two proximity sensors 20220 and 20222 are mounted at two stop extreme positions on the cylinder body of the cylinder 20228. Through the arrangement of the proximity sensors, the position information of the lower-layer tray 20203 can be timely transmitted to a computer, and the computer is provided with a display screen, so that it is convenient for the operator to check the position information.

Figure 4:
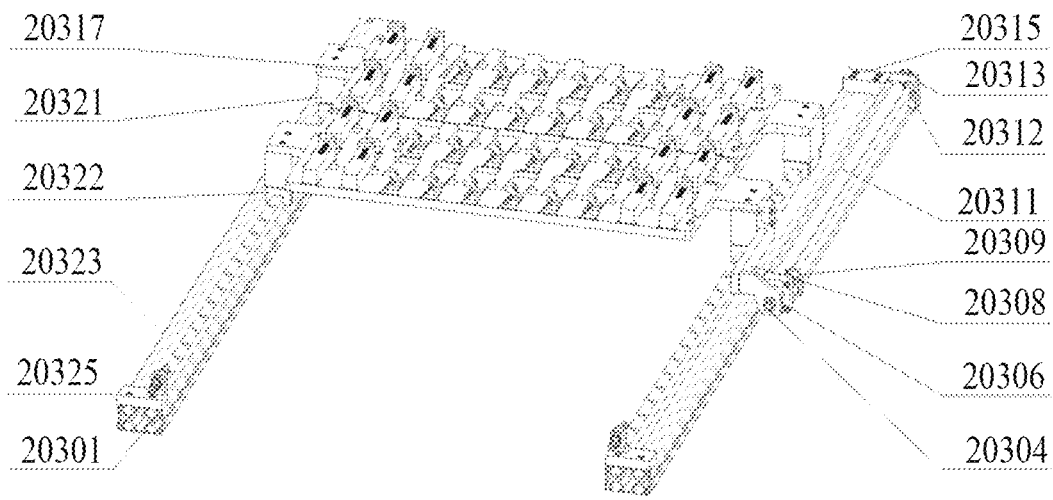
FIG. 4 is an axonometric drawing of an upper-layer tray push-pull module.
Figure 4A:
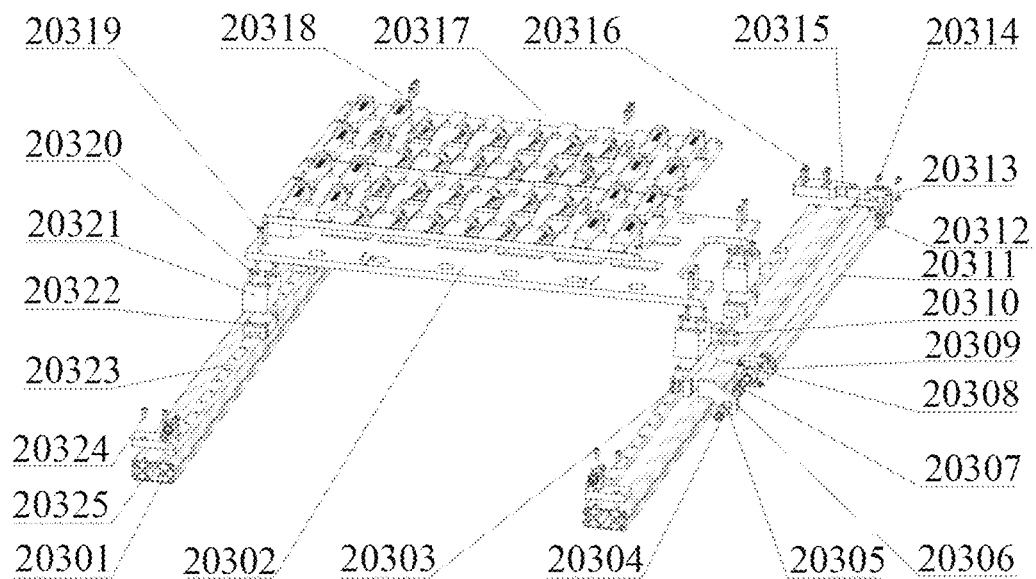
FIG. 4(a) is an explosive view of the upper-layer tray push-pull module.
Figure 4B:
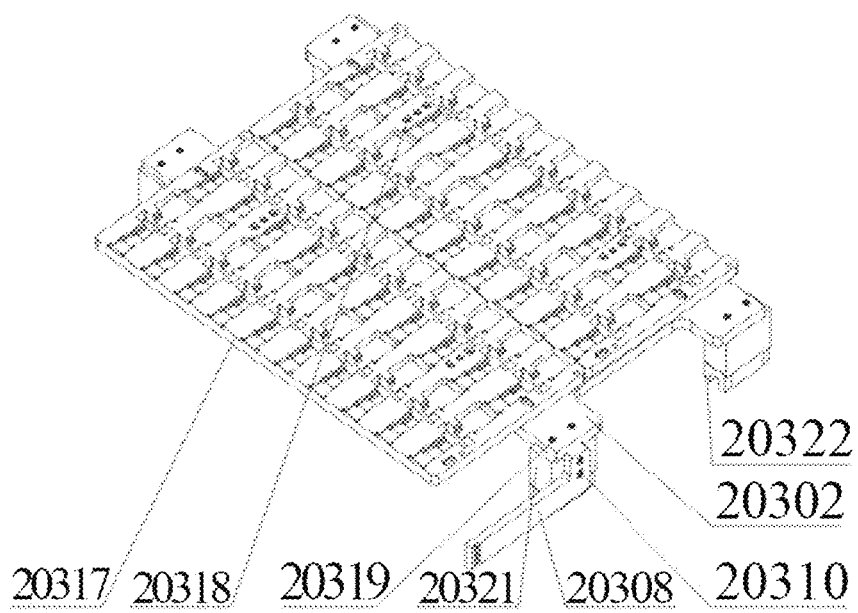
FIG. 4(b) is an axonometric drawing of core components of the upper-layer tray push-pull module.
Figure 4C:
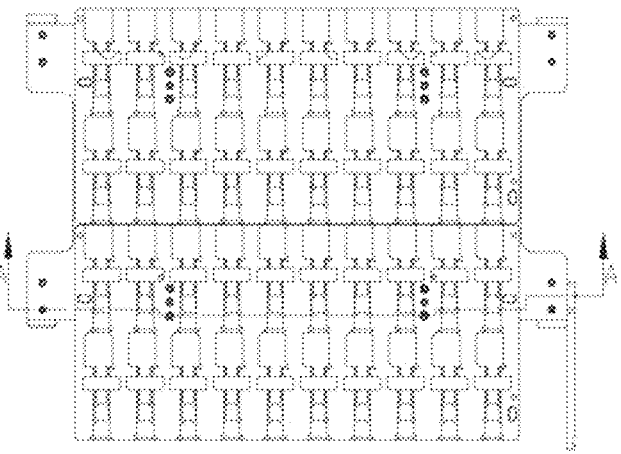
FIG. 4(c) is a top view of the core components of the upper-layer tray push-pull module.
Figure 4D:
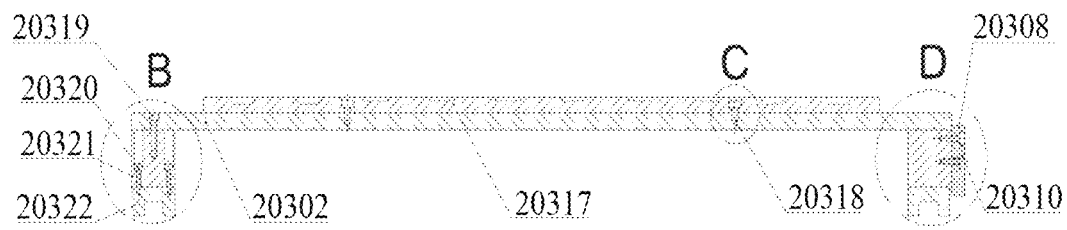
FIG. 4(d) is a section view of FIG. 4(c) along section A-A.
Figure 4E:
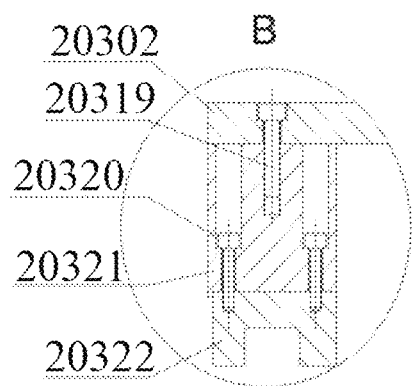
FIG. 4(e) is a partial enlarged drawing of part B in FIG. 4(d)
Figure 4F:
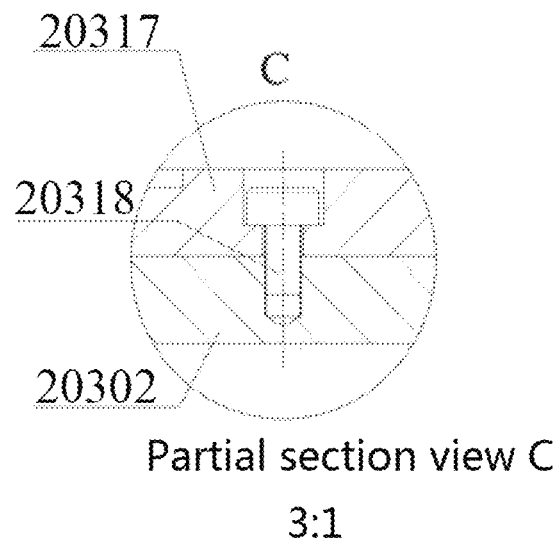
FIG. 4(f) is a partial enlarged drawing of part C in FIG. 4(d)
Figure 4G:
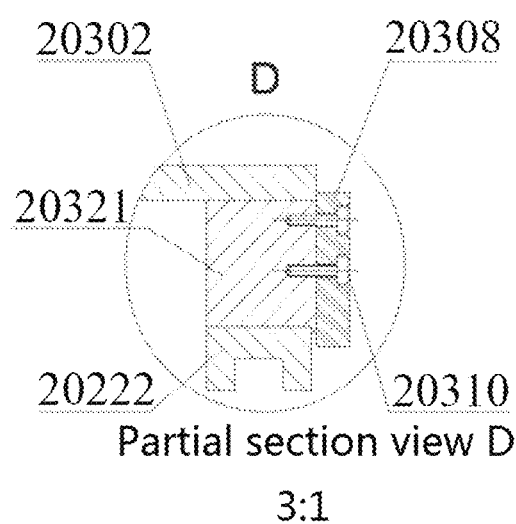
FIG. 4(g) is a partial enlarged drawing of part D in FIG. 4(d)
Figure 4H:
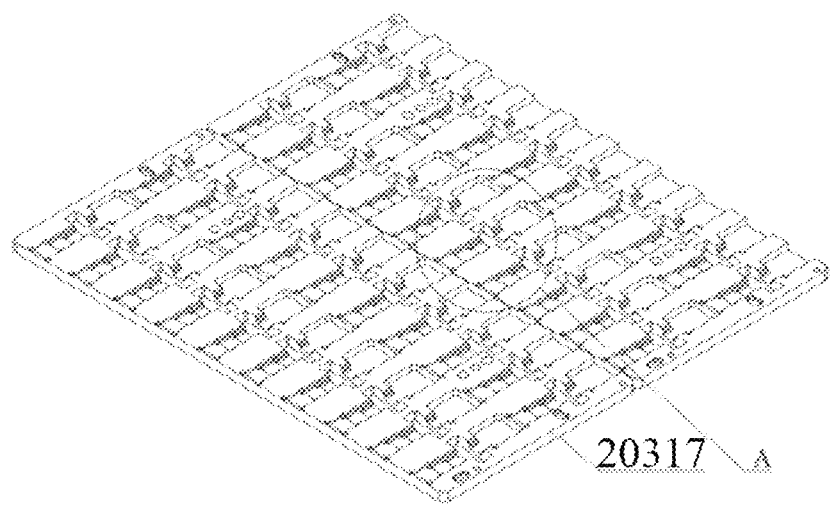
FIG. 4(h) is an axonometric drawing of an upper-layer tray.
Figure 4I:
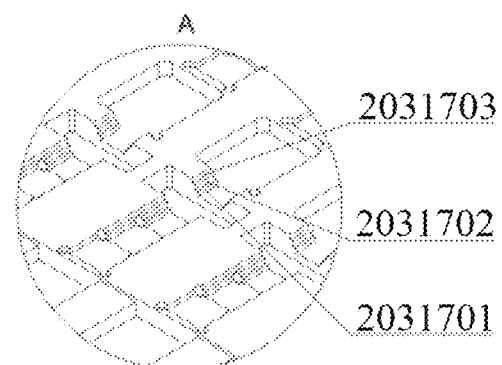
FIG. 4(i) is a partial enlarged drawing of part D in FIG. 4(g)
Figure 4J:
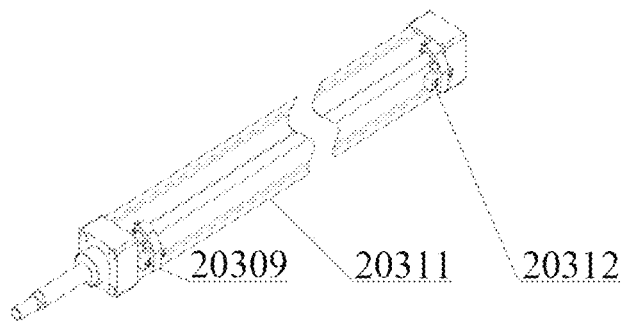
FIG. 4(j) is an axonometric drawing of a cylinder.
Figure 4K:
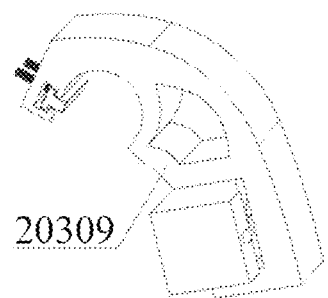
FIG. 4(k) is an axonometric drawing of a proximity sensor mounted on the cylinder.

In the upper-layer tray push-pull module 203 as shown in FIG. 4 to FIG. 4(*k*), an upper-layer tray 20317 is fixed to the upper part of an upper-layer supporting plate 20302 through hexagon socket head cap screws 20318. A plurality of material grooves are formed in the upper-layer tray 20317, and they are respectively upper-layer material grooves 2031701, upper-layer material grooves 2031702 and upper-layer material grooves 2031703, and are used for setting cutter materials, and the inner side portion of each material groove is in a step shape so as to be suitable for different sizes of cutters.

The upper-layer supporting plate 20302 is connected with the upper-layer connecting blocks 20321 through hexagon socket head cap screws 20319. The upper-layer connecting blocks 20321 are fixed onto the sliding blocks 20322 through hexagon socket head cap screws 20320. The guide rails 20323 are fixed onto the aluminum profile frame 20301 along the longitudinal stretching directions of the aluminum profile frame 20301 through hexagon socket head cap screws. One end of a right-angle connecting plate 20308 is tightly attached to the outer sides of the upper-layer connecting blocks 20321 through hexagon socket head cap screws, the other end of the right-angle connecting plate 20308 is connected with a cylinder connecting plate 20306 through hexagon socket head cap screws 20303, and the right-angle connecting plate 20308 and the cylinder connecting plate 20306 are perpendicular to each other.

A threaded part at the top end of a piston rod of a cylinder 20311 penetrates through a shaft sleeve 20307, the cylinder connecting plate 20306, a spring washer 20305 and a hexagon nut 20304 to be screwed, and the piston rod of the cylinder is connected with the cylinder connecting plate 20306 through a connected relationship. A cylinder mounting base 20213 is fixed at the bottom of the cylinder 20311 through hexagon socket head cap screws 20314. One end of a cylinder mounting support 20315 is engaged with a cylinder mounting base 20313, and the other end of the cylinder mounting support 20315 is fixed to the upper surface of the aluminum profile frame 20301 through hexagon socket head cap screws. The upper-layer tray 20317 is driven by the cylinder 20306 to reciprocate along the direction of the guide rails 20323. The buffer cylinder 20325 is fixed to one end of the aluminum profile frame 20301 through hexagon socket head cap screws 20324, and the mounted buffer cylinder 20325 is located at the extreme position which the upper-layer tray 20317 can reach when the upper-layer tray 20317 is pushed out. The buffer cylinder 20325 can limit the conveying position of the upper-layer tray 20317, buffer and shock absorption from the upper-layer tray 20317.

Two proximity sensors 20309 and 20312 are mounted at two stop extreme positions on the cylinder body of the cylinder 20311. When the piston of the cylinder moves to the detection positions of the proximity sensors 20309 and 20312, the sensors transmit the position signal of the upper-layer tray 20317 to the computer, and then the computer transmits the position signal to the robot 3.

The proximity sensors are magnetic proximity sensors and are provided with arc-shaped bayonets, so that the proximity sensors can be conveniently arranged on a guide rod on the circumferential side of the cylinder.

Figure 5:
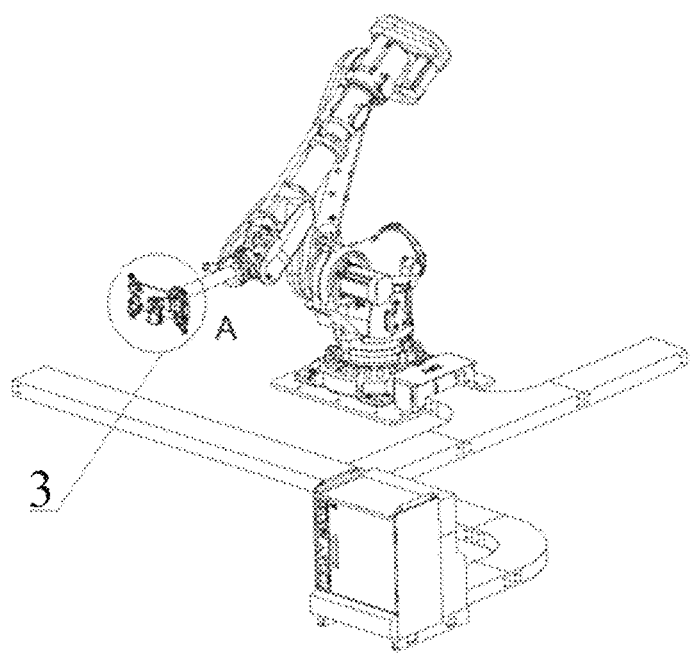
FIG. 5 is an axonometric drawing of a robot.
Figure 5A:
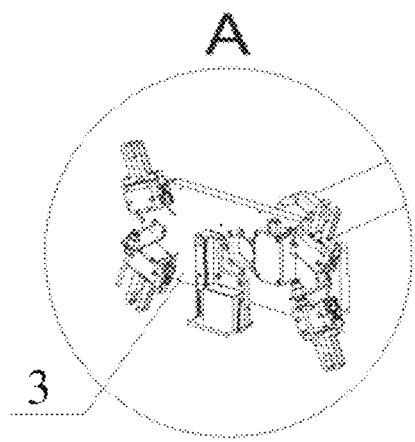
FIG. 5(a) is a partial enlarged drawing of part A in FIG. 5.
Figure 5:
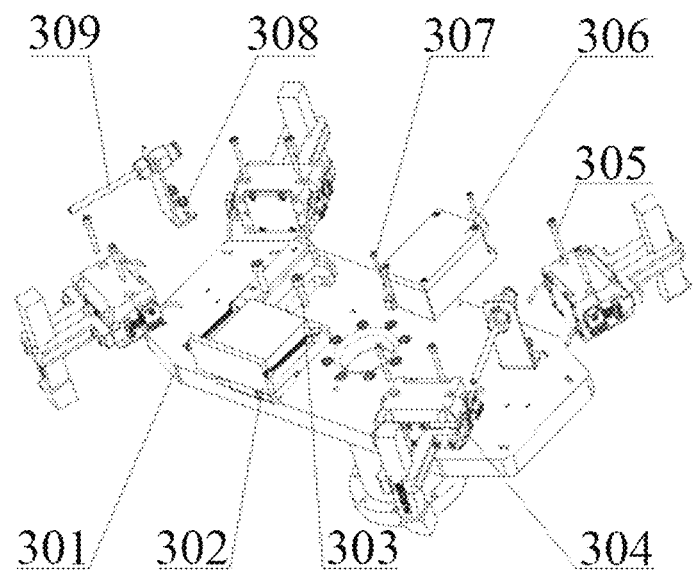
Figure 5C:
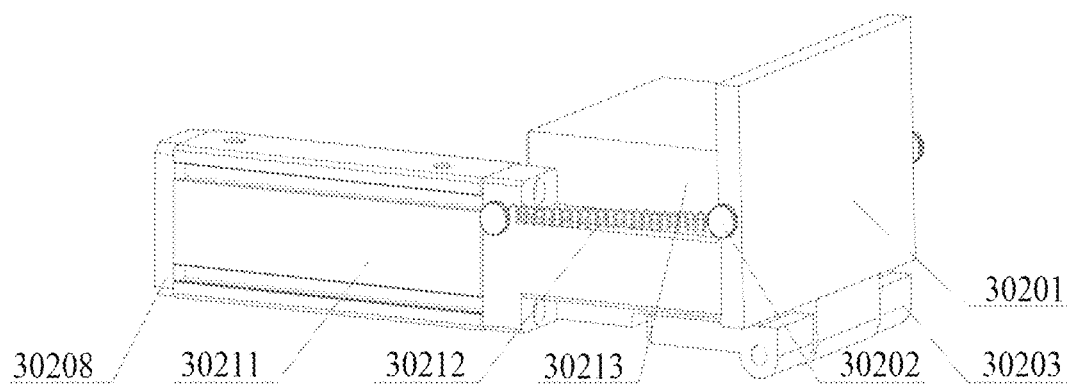
FIG. 5(c) is an axonometric drawing when a laser detecting unit is closed.
Figure 5D:
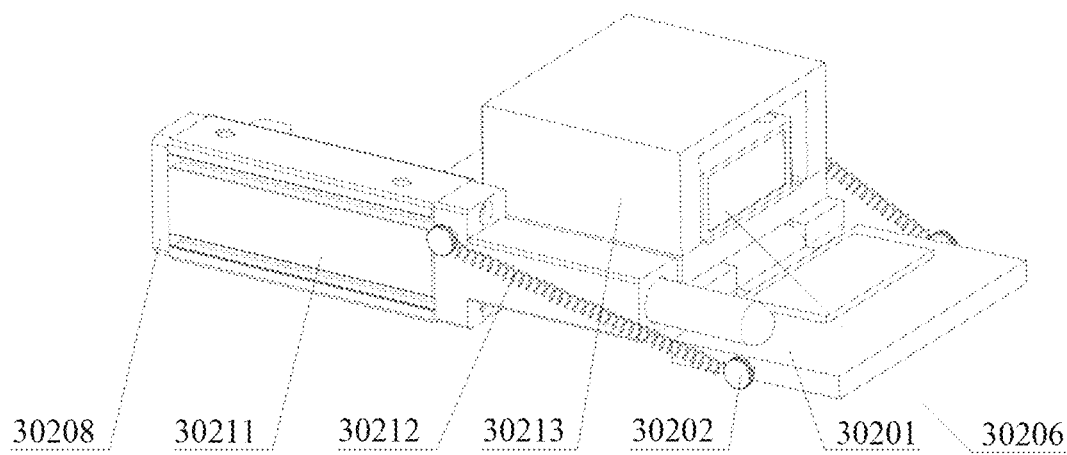
FIG. 5(d) is an axonometric drawing when the laser detecting unit is opened.
Figure 5E:
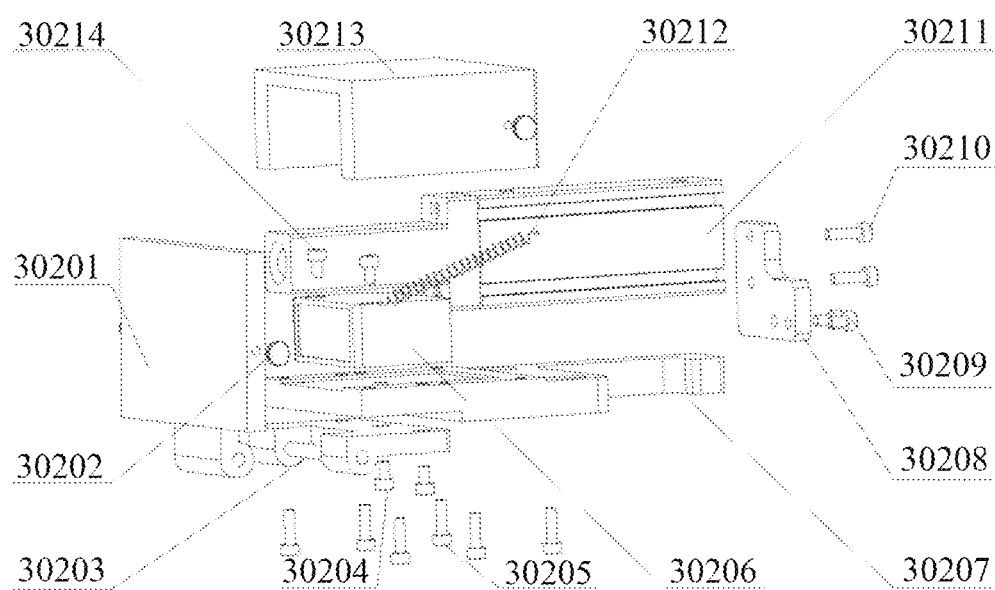
FIG. 5(e) is an explosive view of the laser detecting unit.
Figure 5F:
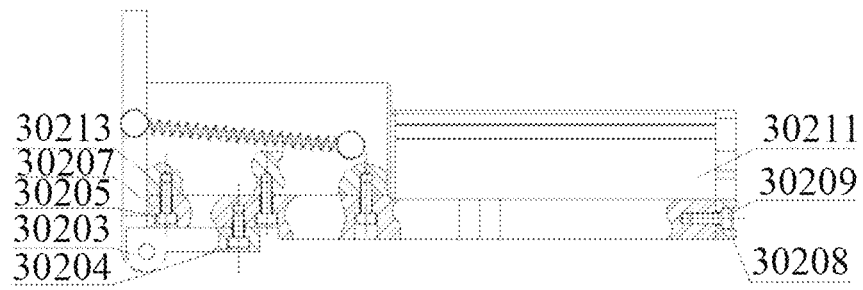
FIG. 5(f) is a partial section view of the laser detecting unit.
Figure 5G:
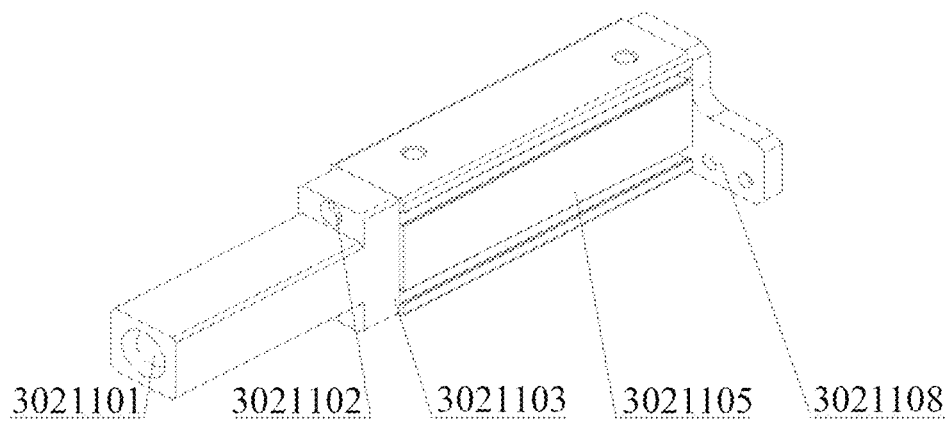
FIG. 5(g) is an axonometric drawing of a linear moving mechanism.
Figure 5H:
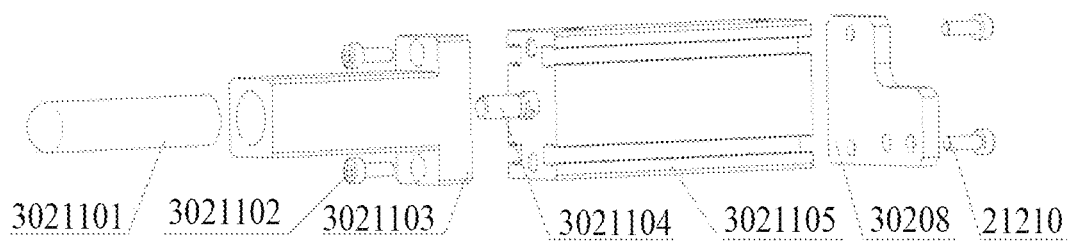
FIG. 5(h) is an explosive view of the linear moving mechanism.
Figure 5I:
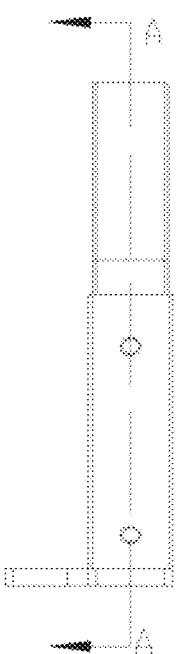
FIG. 5(i) is a top view of a first linear moving mechanism.
Figure 5J:
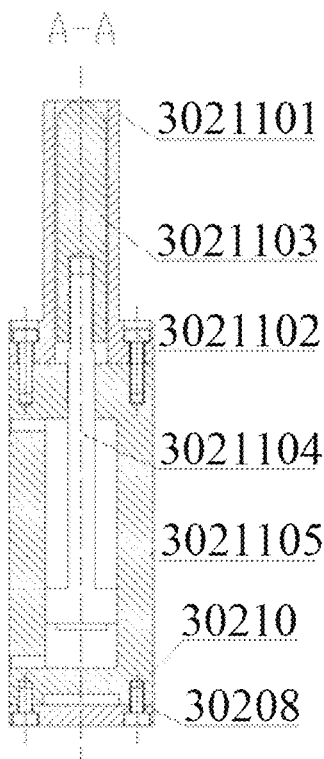
FIG. 5(j) is a section view of FIG. 5(i) along section A-A.
Figure 5K:
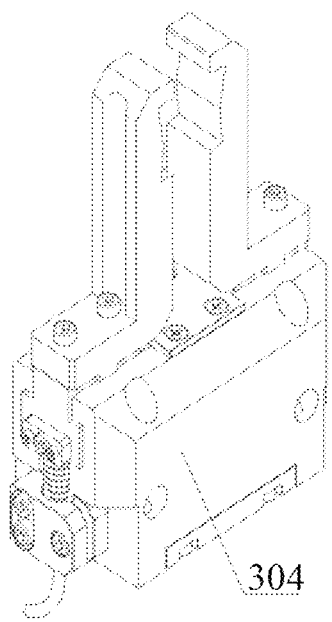
FIG. 5(k) is an axonometric drawing of a clamping jaw.
Figure 5L:
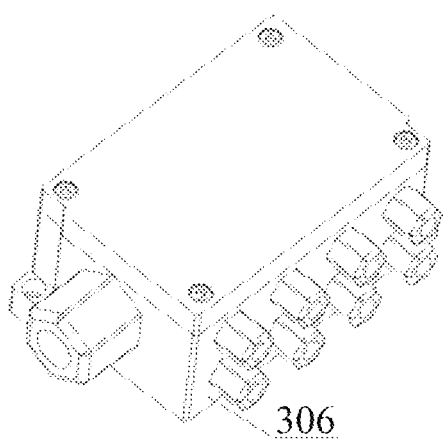
FIG. 5(b) is an explosive view of the robot.

As shown in FIG. 5 to FIG. 5(*b*) and FIG. 5(*k*) to FIG. 5(*m*), the robot 3 includes a robot arm, the robot arm is a multi-degree-of-freedom robot arm and is in the prior art. A base of the robot arm is fixed to the ground, a mechanical arm is arranged at the end of the robot arm and includes a base plate 301. Clamping jaws 304 are fixed to the four corners of the base plate respectively. Each clamping jaw can clamp cutters, a laser detecting unit 302 and an air nozzle 309 are arranged in the center of the four clamping jaws. The air nozzle 309 is used for cleaning smear metal on the positioning tables to ensure reliable positioning of materials, the air nozzle is connected with an air injection pipeline. The orientation of the air nozzle is the same as the orientations of the clamping jaws mounted on the long edge of the base plate.

Specifically, the laser detecting unit 302 is mounted on the base plate 301 through hexagon socket head cap screws 303. The four clamping jaws 304 are mounted at the four corners of the base plate 301 through hexagon socket head cap screws 305, and after the installation is completed, the clamping jaws 304 are placed outwards. A line concentration box 306 is fixedly connected onto the base plate 301 through hexagon socket head cap screws 307 and used for arranging electrical wiring at the front end of the robot. The air nozzle 309 is vertically mounted on the base plate 301 through hexagon washer head tapping screws 308, and the orientation of the installed nozzle is the same as the orientations of the clamping jaws 304 mounted on the long edge of the base plate 301.

It needs to be noted that the clamping jaws 304 are double-finger pneumatic clamping jaws, a clamping groove is formed in the inner side of each finger in the clamping jaw so as to conveniently clamp the cutter materials 1.

As shown in FIG. 5(*c*) to FIG. 5(*j*), in the laser detecting unit 302, knurled screws 30202 are mounted on both sides of a dustproof end cover 30201 and on one side of a seal cover 30213. One end of a pin shaft seat 30203 is engaged with the dustproof end cover 30201. A pin shaft of the pin shaft seat 30203 penetrates through a pin shaft hole of the dustproof end cover 30201, so that the dustproof end cover 30201 rotates around the pin shaft of the pin shaft seat 30203. The other end of the pin shaft seat 30203 is fixed below a bottom mounting plate 30207 through hexagon socket head cap screws 30204. A laser detector 30206 is fixed into a mounting groove in the bottom mounting plate 30207 through hexagon socket head cap screws 30214. A rear end mounting plate 30208 is tightly attached to the rear end face of the bottom mounting plate 30207 through hexagon socket head cap screws 30209, and the rear end mounting plate 30208 and the bottom mounting plate 30207 are perpendicular to each other.

A first linear moving mechanism 30211 is mounted on the rear end mounting plate 30208 through hexagon socket head cap screws 30210, the installed first linear moving mechanism 30211 is perpendicular to the rear end mounting plate 302-08, and the rear end face of the first linear moving mechanism 30211 and the rear end face of the bottom mounting plate 30207 are located on the same plane. One end of each of hooks at the two ends of a reset spring 30212 are hung on the knurled screw 30202 on the side of the dustproof end cover 30201, and the other end of the hook are hung on the knurled screw 30202 on the side of the seal cover 30213. The seal cover 30213 is fixed on the bottom mounting plate 30207 through hexagon socket head cap screws 30205, and the laser detector 30206 is located in an inner cavity of the seal cover 30213 after installation is completed.

In the first linear moving mechanism 30211, a round-head ejector rod shell 3021103 is fixedly connected with a cylinder body 3021105 through hexagon socket head cap screws 3021102. A round-head ejector rod 3021101 is located in an inner cavity of the round-head ejector rod shell 3021103, and the round-head ejector rod 3021101 is screwed with the front end thread part of a cylinder piston rod 3021104 through a threaded hole machined in the round-head ejector rod 3021101. When the robot 3 controls the laser detector 30206 to perform a detection, the cylinder piston rod 3021104 extends out to drive the round-head ejector rod 3021101 to eject the dustproof end cover 30201 open, the laser detector 30206 carries out the detection at the moment, after the detection is completed, the cylinder piston rod 3021104 retracts, and the dustproof end cover 30201 is closed under the action of the reset springs 30212. The whole detection process is quicker through the cooperation of the cylinder transmission and the reset springs, so that the detection efficiency is remarkably improved.

Figure 6:
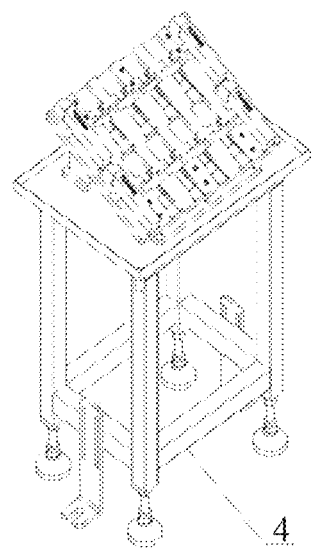
FIG. 6 is an axonometric drawing of a transfer station.
Figure 6A:
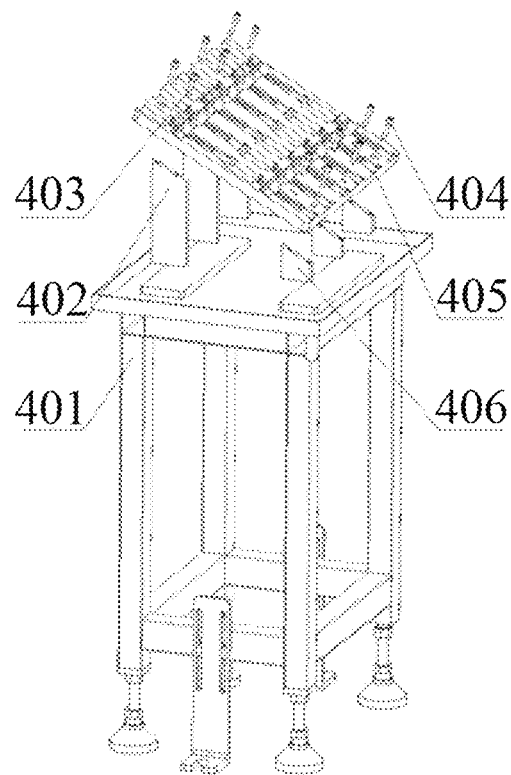
Figure 6B:
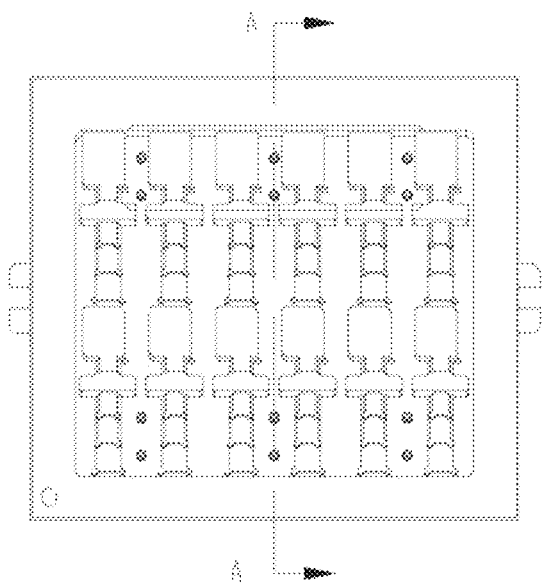
Figure 6C:
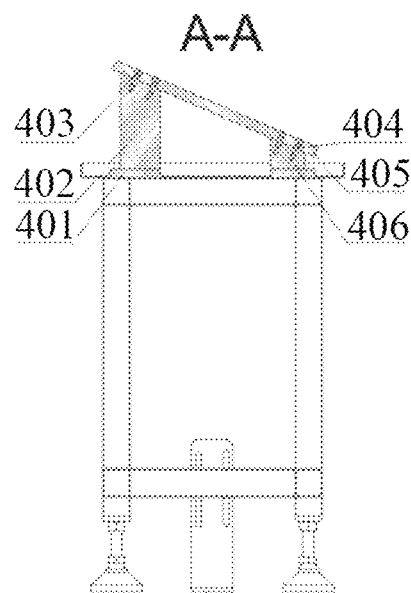

In the transfer station 4 as shown in FIG. 6 to FIG. 6(*d*), the transfer station includes a transfer station base body, a plurality of supporting plates are arranged on the upper surface of the transfer station base body. Supporting plates 402 and supporting plates 406 are directly welded to the transfer station base body 401. The supporting plates 402 and the supporting plates 406 are parallel to each other after the welding is completed, the supporting plates 402 and the supporting plates 406 are arranged from front to back. The supporting plates 402 are higher than the supporting plates 406, and the supporting plates 402 and the supporting plates 406 are located on the same plane and are perpendicular to the upper surface of the transfer station base body 401. The transfer tray 405 is respectively fixed on the upper end faces of the supporting plates 402 and the supporting plates 406 through hexagon socket head cap screws 403 and hexagon socket head cap screws 404. Due to the fact that the heights of the supporting plates 402 and the supporting plates 406 are different, the transfer tray 405 is in an inclined state after being mounted.

A plurality of material grooves is formed in the transfer tray 405, and includes transfer material grooves 40501, transfer material grooves 40502 and transfer material grooves 40503, and are used for setting cutter materials, and the inner side portion of each material groove is in a step shape so as to be suitable for different sizes of cutters.

Figure 7:
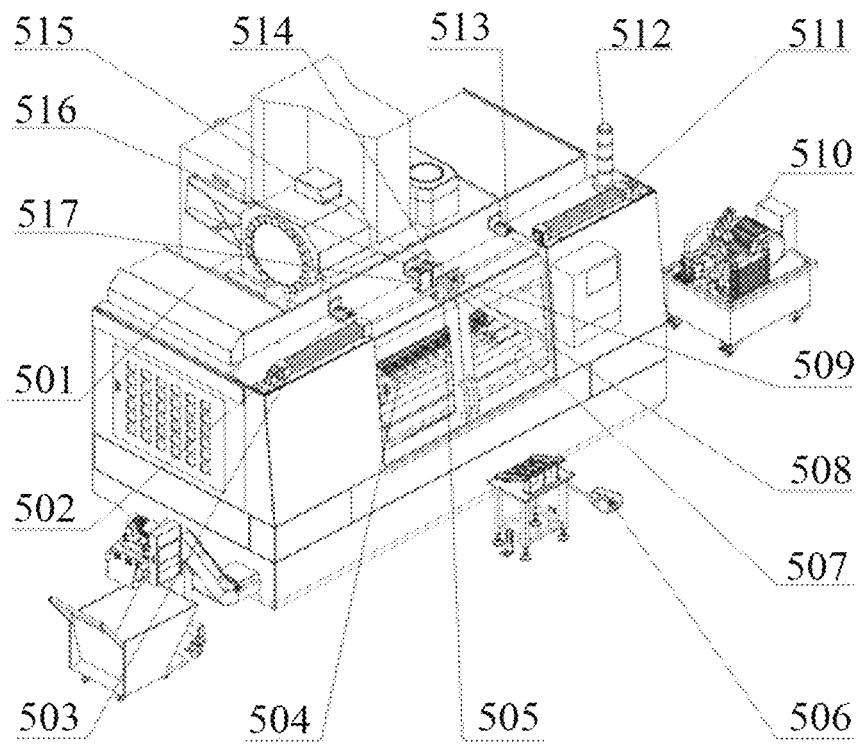
FIG. 7 is an axonometric drawing when a protective door of a machining center is closed.
Figure 7A:
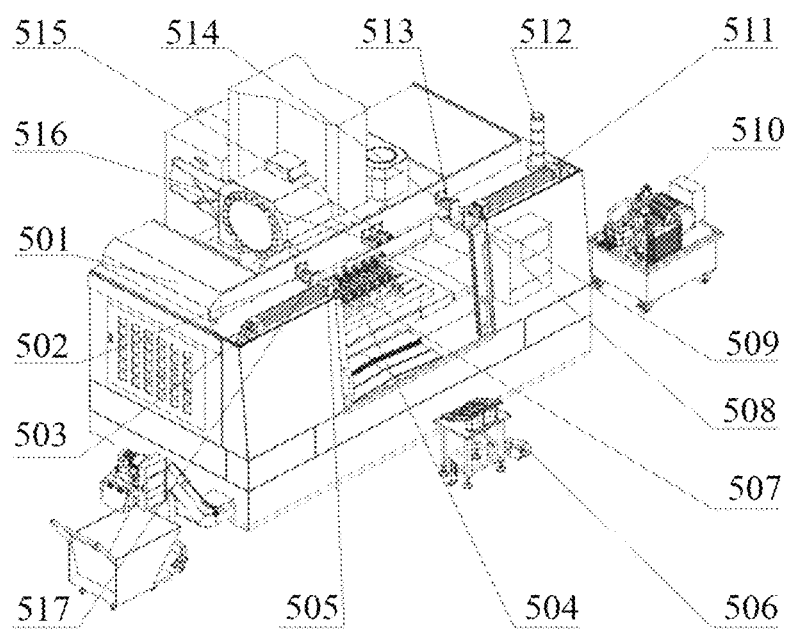
Figure 7B:
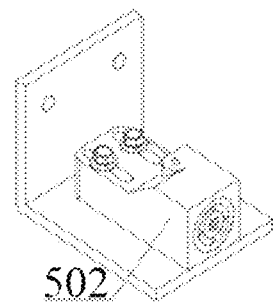
Figure 7C:
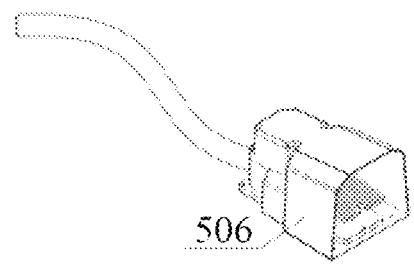

In the machining center 5 as shown in FIG. 7 to FIG. 7(*c*), the machining center is a machine tool and can be used for machining cavities of the cutters, the machine tool is provided with protective doors. A plurality of proximity sensors are arranged on one side of the protective doors of the machine tool. The proximity sensors 502, 516, 515 and 513 are all fixed to the positions above the protective doors in the machining center shell 501 through hexagon washer head tapping screws. The proximity sensor 502 and the proximity sensor 516 are mounted at the opening and closing extreme positions of the left protective door, and the proximity sensor 513 and the proximity sensor 515 are mounted at the opening and closing extreme positions of the right protective door. A cylinder 503 and a cylinder 511 are fixed to the positions, above the protective doors, on the machining center shell 501 through hexagon washer head tapping screws, and the telescopic directions of the mounted cylinders are parallel to the opening and closing directions of the two protective doors. A square connecting block 507 and a square connecting block 509 are fixedly connected with a cylinder piston rod through hexagon nuts. One end of the L-shaped connecting block 505 and the square connecting block 507 are connected through hexagon socket head cap screws and are vertically arranged. The other end of the L-shaped connecting block 505 is fixed to a critical position of a left protective door of the machining center through hexagon socket head cap screws. One end of an L-shaped connecting block 508 and the square connecting block 509 are connected through hexagon socket head cap screws and are perpendicular to each other after being installed, and the other end of the L-shaped connecting block 508 is fixed to the critical position of a right protective door of the machining center through hexagon socket head cap screws. Through the installation relation, the protective doors of the machining center are driven to be opened and closed through the cylinder. An L-shaped trigger block 517 is mounted on the left protective door of the machining center through screws and is parallel to the L-shaped connecting block 505. The sizes of gaps between the L-shaped trigger block 517 and the proximity sensor 516 and between the L-shaped trigger block 517 and the proximity sensor 502 are arranged such that the L-shaped trigger block 517, the proximity sensor 502 and the proximity sensor 516 do not interfere with each other when the left protective door is opened and closed, and such that a displacement area of the L-shaped trigger block 517 intersects with a detection area of the proximity sensor 516 and a detection area of the proximity sensor 502. An L-shaped trigger block 514 is mounted on the right protective door of the machining center through screws and is parallel to the L-shaped connecting block 508, and the sizes of gaps between the L-shaped trigger block 514 and the proximity sensor 515 and between the L-shaped trigger block 514 and the proximity sensor 513 are arranged such that the L-shaped trigger block 514, the proximity sensor 515 and the proximity sensor 513 do not interfere with each other when the right protective door is opened and closed, and such that a displacement area of the L-shaped trigger block 514 intersects with a detection area of the proximity sensor 515 and a detection area of the proximity sensor 513.

The proximity sensors are photoelectric switches, all the cylinders and the proximity sensors are connected with an electric control center, namely the computer, of the robot. The opening and closing states of the protective doors can be fed back to the robot 3 in time through the mounted proximity sensors and trigger blocks. A foot switch 506 is arranged in front of the machining center 5 and is used for manually opening or closing a multi-station gas detection hydraulic clamp 504 by the operator; and a hydraulic station 510 is placed on the side of the machining center and provides hydraulic power for the machining center.

Figure 8:
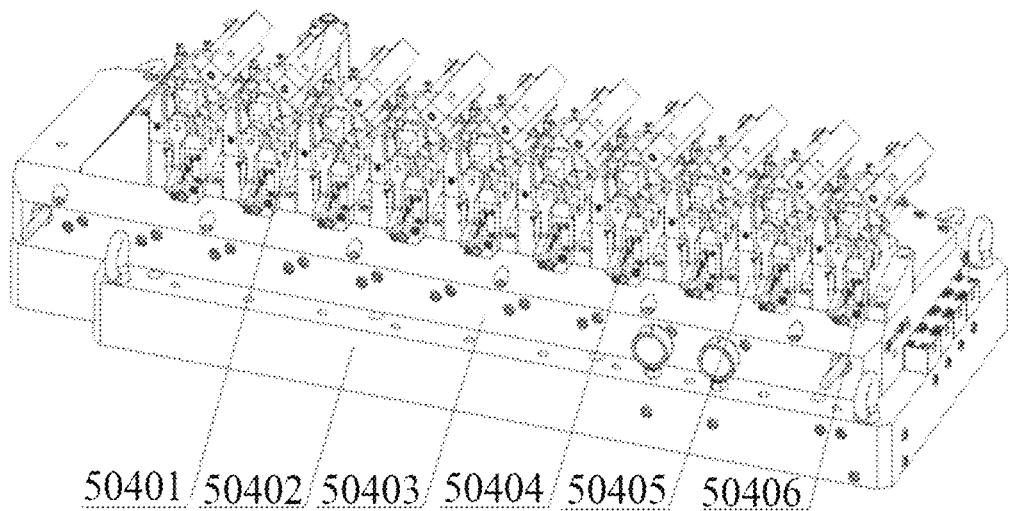
FIG. 8 is an axonometric drawing of a multi-station gas detection hydraulic clamp.
Figure 8A:
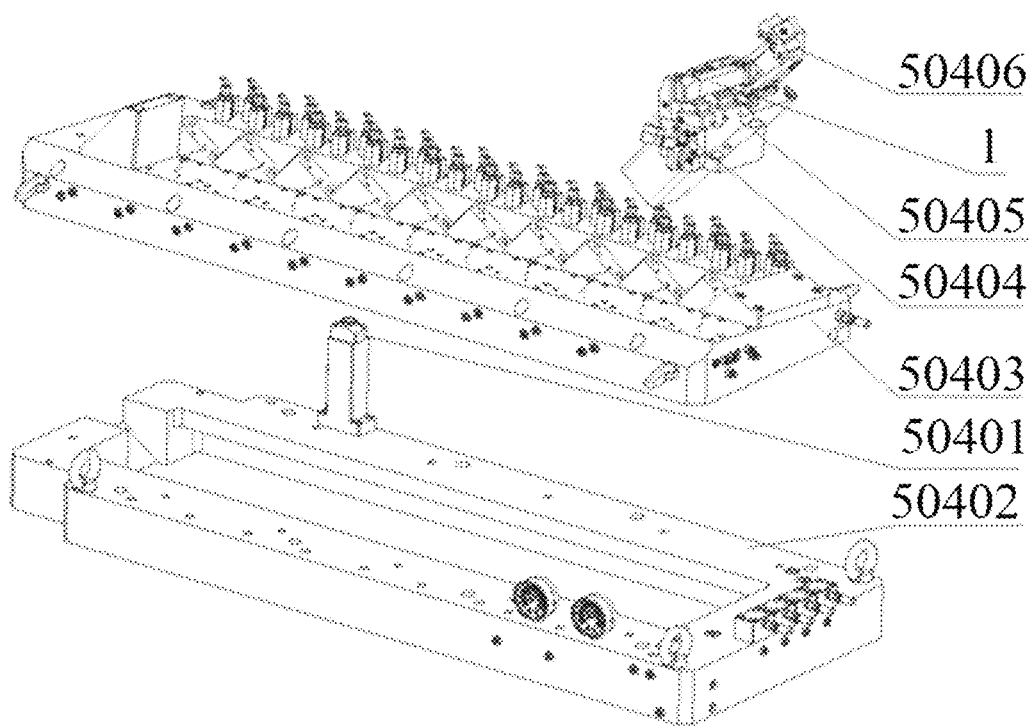
Figure 8B:
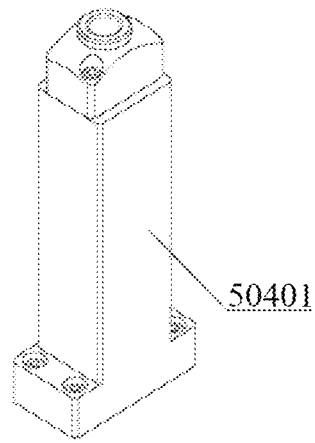
Figure 8C:
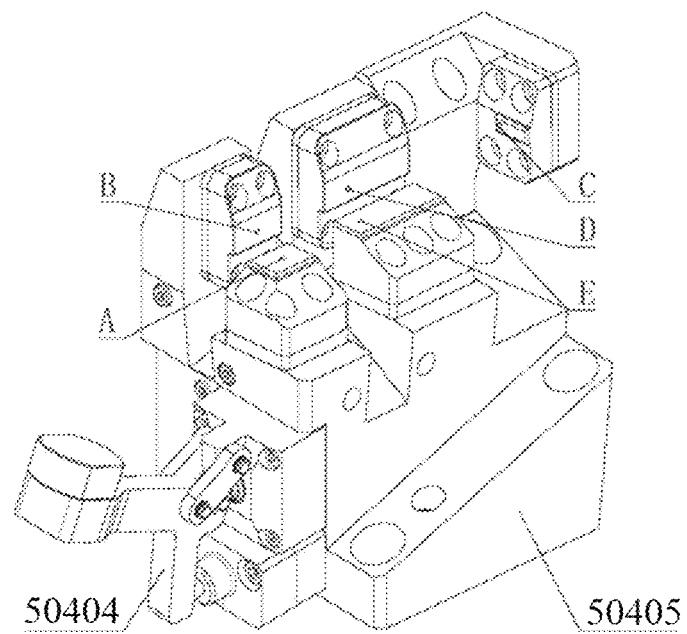
Figure 8D:
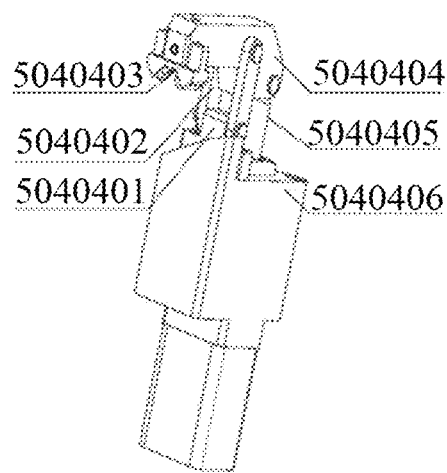
Figure 8E:
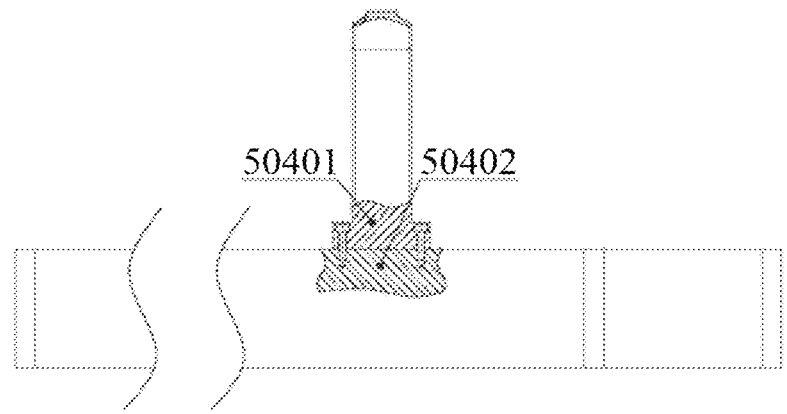
Figure 8F:
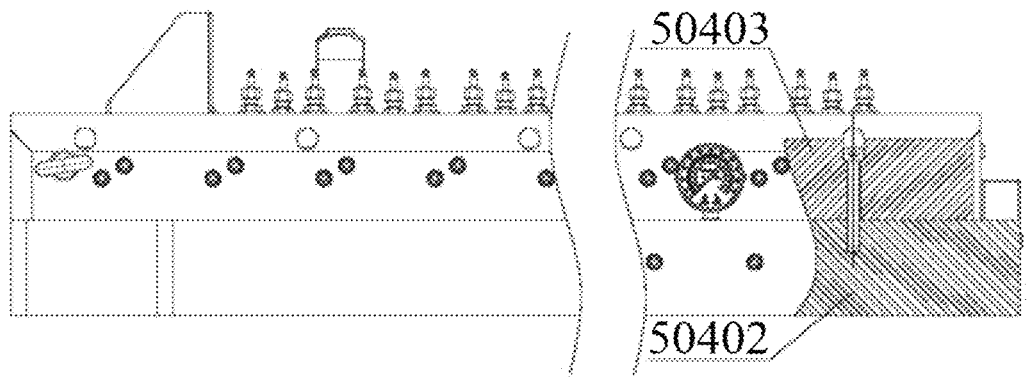
Figure 8G:
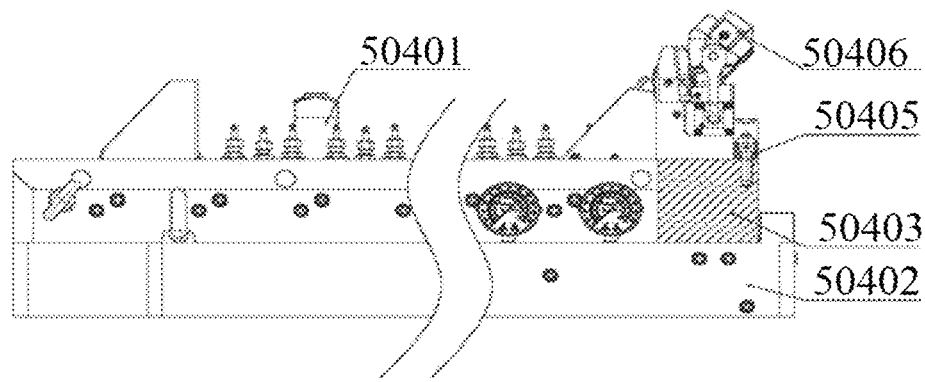

In the multi-station gas detection hydraulic clamp 504 as shown in FIG. 8 to FIG. 8(*h*), a tool setting gauge 50401 and a supporting plate 50403 are both fixed to a base plate 50402 through socketed screws. A positioning table 50405 is fixed to the supporting plate 50403 through screws, and an end face clamping mechanism 50404 is mounted in front of the positioning table 50405 through screws. A zigzag groove is formed in the top of the supporting plate 50403 to be fixedly connected with the upper clamping mechanism 50406 in a matched mode. In the upper clamping mechanism 50406, a pin seat 5040601 is fixed onto a cylinder body 5040601 of the hydraulic cylinder through screws. The lower end of a connecting rod 5040602 is positioned with the pin seat 5040601 through a pin shaft, and the upper end of the connecting rod 5040602 is positioned with a clamping arm 5040604 through a pin shaft. The front end of the clamping arm 5040604 is mounted at the front end of the clamping arm 5040604 through a V-shaped clamping block 5040603 through screws, and the rear end of the clamping arm 5040604 is positioned with a pin seat piston rod 5040605 through a pin shaft.

In addition, a gas detection pipeline is provided with pressure sensors, and the pressure sensors are respectively connected with controllers of the machining centers and the computer, so that the computer and the controllers of the machining centers detect the pressure of gas in the gas detection pipelines, and the controllers of the machining centers are used for controlling the operation of the machining centers, preferably PLCs (Programmable Logic Controllers).

It is noted that the multi-station gas detection hydraulic clamp is specifically disclosed in the patent application with No. CN2019112821187, titled with "Multi-station turning tool bit milling clamp system for intelligently detecting clamping force", and details are not given here.

Figure 9:
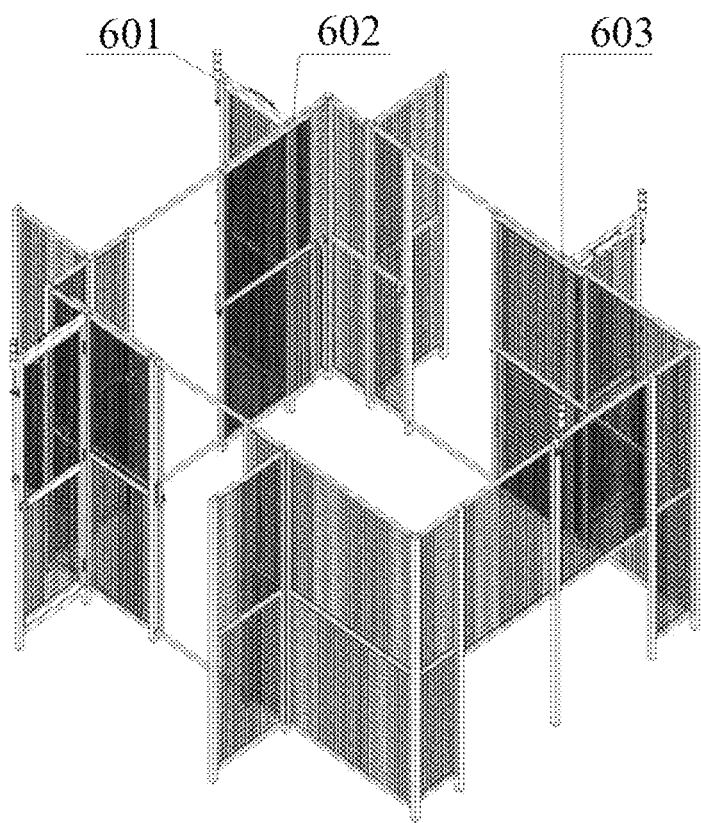
FIG. 9 is an axonometric drawing of a protective fence.
Figure 9A:
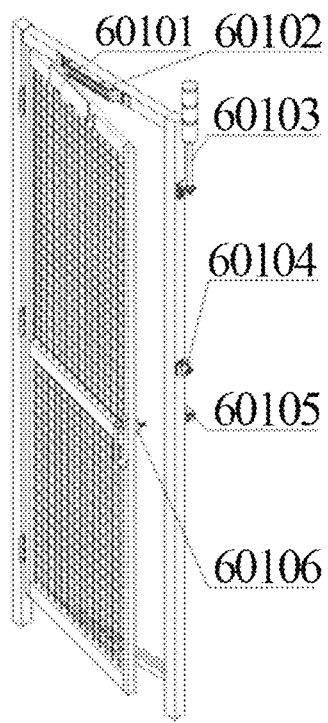
Figure 9B:
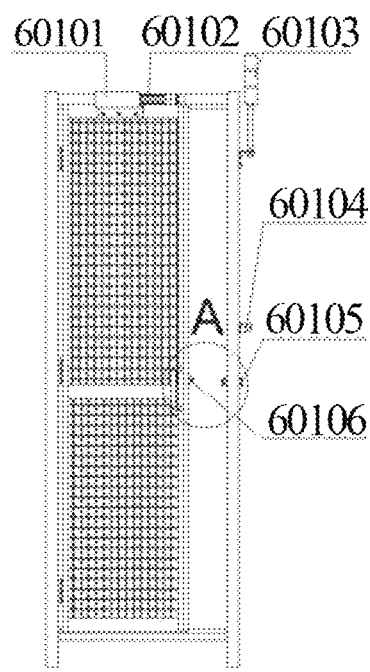
Figure 9C:
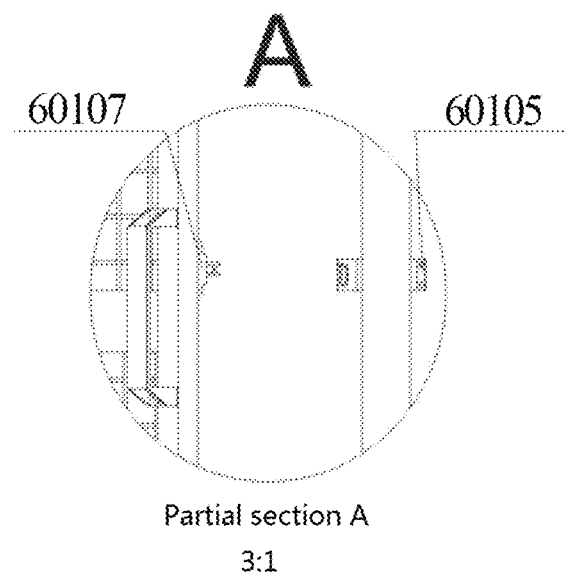
Figure 9D:
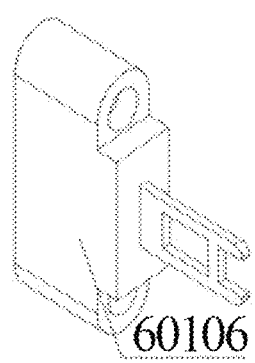

In the protective fence 6 as shown in FIG. 9, the overall frame of the protective fence 6 is of a rectangular, the safety door 601 and the forbidden door 602 are arranged on each of three adjacent side fences of the protective fence 6. The safety door 601 and the forbidden door 602 of each side fence are perpendicular to each other, the three forbidden doors and a protective guard on one side form a rectangular shape and a space. The forbidden door is provided with an opening and closing door which can be opened and closed, the opening and closing door is engaged with a forbidden door socket fixed to the forbidden door through a forbidden door bolt to achieve opening and closing of the door. Each side is provided with two safety doors, the two safety doors are arranged on the two sides of the opening and closing door of each forbidden door respectively, the safety door on one side is a fixed door, and the safety door on the other side can be opened.

In the safety door 601 as shown in FIG. 9(*a*) to FIG. 9(*f*), an iron plate 60101 is mounted at the top of the safety door 601, and a magnetic lock 60102 is mounted at the position, corresponding to the iron plate 60101, on the outer side of a door frame of the safety door. A beep signal lamp 60103 is fixed on the door frame of the safety door. An electromagnetic switch 60104 is fixed right below the beep signal lamp 60103. A safety door bolt 60106 is fixed to the middle position of the safety door 601, and meanwhile a safety door socket 60105 is mounted on the inner side of the door frame of the safety door. After being installed, the safety door bolt 60106 and the safety door socket 60105 are located at the same height.

In the forbidden door 602 as shown in FIG. 9(*g*) to FIG. 9(*h*), a forbidden door socket 60201 and a forbidden door socket 60204 are fixed to the door frame of the forbidden door through screws. A forbidden door bolt 60202 and a forbidden door bolt 60203 are mounted at the middle positions of the two sides of the forbidden door 602. After being installed, the forbidden door socket 60201, the forbidden door bolt 60202, the forbidden door bolt 60203 and the forbidden door socket 60204 are located at the same height.

The specific working process is as follows.

As shown in FIG. 1, when the production line is started, in order to fully master the initial situation of the production line and avoid unexpected situations, during processing the first batch of materials, the operator first manually performs the following operations:

(1) manually opening the protective door of the machining center 5 by the operator, then controlling the multi-station gas detection hydraulic clamp 504 to be opened through the foot switch 506 located in front of the machining center 5 by the operator, and placing blank cutter materials 1 on a clamping station of the multi-station gas detection hydraulic clamp 504; then controlling the multi-station gas detection hydraulic clamp 504 to clamp the materials tightly through the foot switch 506 located in front of the machining center 5 by the operator; and then manually closing the protective door of the machining center 5 by the operator, and executing the same operation on the three machining centers 5 in sequence and starting the three machining centers 5.

(2) guaranteeing that the three transfer stations 4 are in an empty state;

(3) manually placing the blank cutter materials 1 on the upper-layer trays 20317 of the two material tables 2 by the operator, and pressing corresponding control buttons after completing the placement of the blank cutter materials. (It should be noted that cylinder electromagnetic valves for controlling the lower-layer tray push-pull module 202 and the upper-layer tray push-pull module 203 are two-position valves, where when the production line stops production and is powered off, the cylinder 20228 and the cylinder 20311 stretch out and drive the lower-layer tray 20203 and the upper-layer tray 20317 to be pushed out at the same time. Therefore, when the production line is started, the upper-layer trays and the lower-layer trays in the two material tables 2 are pushed out, and the upper-layer tray 20317 is located right above the lower-layer tray 20203).

(4) adjusting the robot 3 to be in an automatic mode by the operator, and enabling the robot to replace the operator to work.

As shown in FIG. 1, the working process of an automatic mode of the robot 3 is as follows.

After the operator places the blank cutter materials 1 on the material tables 2, the robot 3 firstly grabs the blank materials in the material tables 2 to the transfer station 4. After the machining center 5 performs a machining cycle on the blank cutter materials clamped by the multi-station gas detection clamp 504, the machining center controls the clamp to be opened and sends a loading signal and an unloading signal to the robot 3 at the same time. After receiving the signals, the robot 3 opens the protective door of the machining center, and then the robot 3 exchanges finished materials on the multi-station gas detection clamp with the blank materials on the transfer station 4. After the exchange is completed, the robot 3 exits from the machining center, then the protective door of the machining center is closed, and finally a starting signal is sent to the machine tool. After the machining center receives the starting signal, the multi-station gas detection clamp 504 is controlled to clamp the blank cutter materials 1 tightly, and the main shaft is started for machining. In the machining process of the machining center, the robot 3 exchanges the finished materials on the transfer station 4 and the blank materials on the material table 2 at the moment. When the material table 2 is full of the finished materials, the operator takes away the finished materials and places the blank materials on the material table, and so on. Further description is provided below with reference to FIG. 10.

S1, as shown in FIG. 3 to FIG. 4 (k), the material table 2 includes the lower-layer tray push-pull module 202 and the upper-layer tray push-pull module 203, after one production cycle is finished, the robot 3 pushes out trays containing finished product cutter materials which are just machined and pulls the trays in another layer containing blank cutter materials back to continue to work, the double-layer trays alternately supply materials to the robot 3, the waiting time of the robot 3 can be remarkably reduced so as to improve the working efficiency of the production line. Different types of material positioning grooves are formed in the lower-layer tray 20203 and the upper-layer tray 20317 respectively, the different types of material positioning grooves are arranged in a step shape, the space six-degree-of-freedom of cutter materials with different specifications can be completely limited in the production process, and the different types of cutter materials 1 can be reliably positioned. The proximity sensors 20220 and 20222 are mounted at two stop extreme positions on the cylinder body of the cylinder 20228, and the proximity sensors 20309 and 20312 are also mounted at two stop extreme positions on the cylinder body of the cylinder 20311. Through the two pairs of proximity sensors, the position information of the upper-layer tray and the position information of the lower-layer tray can be timely transmitted to the robot 3 and the operator. When the operator places the blank materials on the pushed-out tray, a completion signal is sent to the robot 3 through the control button 20102 or the control button 20103.

Figure 5M:
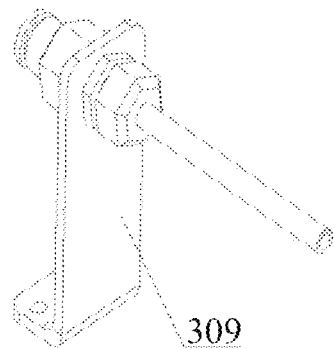

As shown in FIG. 5 to FIG. 5(m), if the operator does not place the blank cutter materials at designated positions in the tray positioning grooves when placing the blank cutter materials, position errors and positioning errors are generated at the moment. When the robot 3 grabs the blank cutter materials, accidental situations such empty clamping and falling are likely to happen. In order to avoid the situations, before the robot 3 grabs the blank cutter materials 1, the cylinder piston rod 3021104 is firstly controlled to drive the round-head ejector rod 3021101 to be pushed out to open the dustproof end cover 30201, and then the laser detector 30206 detects whether the blank cutter materials 1 to be clamped are located at correct clamping positions or not. If the positions of the blank cutter materials 1 are incorrect, the robot 3 pauses the clamping work, and meanwhile, the robot 3 can control the beep signal lamp 603 to give an alarm. At this time, the operator is required to intervene manually. If the cutter materials 1 to be clamped are detected to be located at the correct positions, the robot 3 controls the clamping jaws 304 to clamp the blank cutter materials 1 onto the three transfer stations 4. In view of the facts that the environment of a production workshop is poor, the robot 3 needs to enter the machining center 5 for multiple times in subsequent work, and the internal environment of the machining center is severe (oil stains, oil mist and the like), in order to prevent the laser detector 30206 from being polluted, after the detection is finished, the robot 3 immediately controls the cylinder piston rod 3021104 to drive the round-head ejector rod 3021101 to retract, and the dustproof end cover 30201 is closed under the action of the reset springs 30212, so that the whole detection process is quicker through the cooperation of cylinder transmission and the reset springs in the detection process, and the detection efficiency is improved.

Figure 6D:
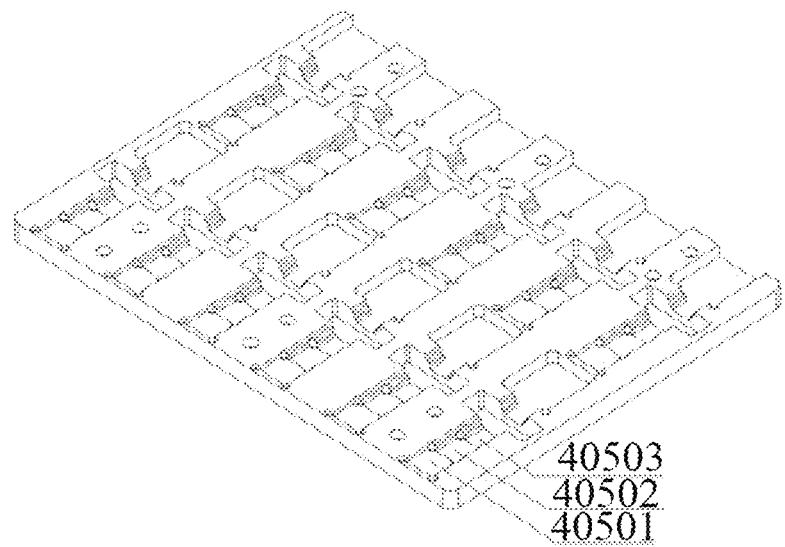

As shown in FIG. 6 to FIG. 6(d), the transfer tray 405 is mounted on the transfer station 4. In the production process, in order to achieve reliable positioning of different types of cutter materials 1, different types of material positioning grooves are machined in the transfer tray 405, which is the same as the lower-layer tray 20203 and the upper-layer tray 20316, the different types of material positioning grooves are arranged in a step shape, the space six-degree-of-freedom of the cutter materials 1 with the different specifications can be completely limited by the robot to place the cutter materials 1 in the positioning grooves of the transfer tray 405, the transfer tray 405 is obliquely placed. When the robot 3 clamps the cutter materials 1 subsequently, the cutter materials 1 can be positioned in the positioning grooves for the second time under the action of gravity, so that the reliability of the clamping jaws 304 for subsequently clamping the cutter materials in the transfer station is improved.

S2, as shown in FIG. 5 and FIG. 7 to FIG. 8, after all materials clamped on the multi-station gas detection hydraulic clamp 504 in the machining center 5 are machined, the machining center 5 can control the multi-station gas detection hydraulic clamp 504 to be opened, and meanwhile the machining center 5 sends the signal to the robot 3 to inform the robot 3 to carry out loading and unloading procedures. When the robot 3 receives the signal sent by the machining center 5, the cylinders 503 and 511 can be controlled to open the protective doors of the machining center, the signal is sent to the robot 3 through the proximity sensors 502 and 513, and then the robot exchanges the cutter materials 1 between the machining center 5 and the transfer station 4. When the robot 3 places the blank cutter materials 1 on the positioning table 50405, if smear metal exists on the positioning table 50405 at the moment, inaccurate positioning of the blank cutter materials 1 can be caused. In order to avoid the situation, the smear metal on the positioning table 50405 are blown away through the nozzle 309 before the robot 3 places the blank cutter materials 1. The blank cutter materials 1 are placed after the smear metal is cleaned.

After the robot 3 completely exchanges the finished cutter materials 1 on the multi-station gas detection hydraulic clamp 504 with the blank cutter materials 1 on the transfer station 4, the robot returns to a safety area in a protective frame 6, then the air cylinders 503 and 511 are controlled to close the protective doors of the machining center. When L-shaped trigger blocks 517 and 514 are moved to the detection positions of the proximity sensors 516 and 515 respectively, the proximity sensors 516 and 515 transmit the position signals to the robot 3, and at the moment, the robot 3 determines that the current protective doors of the machining center have been fully closed and issues a start command. At the moment, the machining center controls the multi-station gas detection hydraulic clamp 504 to clamp the blank cutter materials 1 tightly, and then the multi-station gas detection hydraulic clamp 504 detects whether positioning and clamping of the blank cutter materials are reliable or not. If the operation is reliable, the machining center starts the main shaft for machining and sends the signal to the robot 3 at the same time, and the robot 3 leaves the safety area to execute other operations.

Figure 8H:
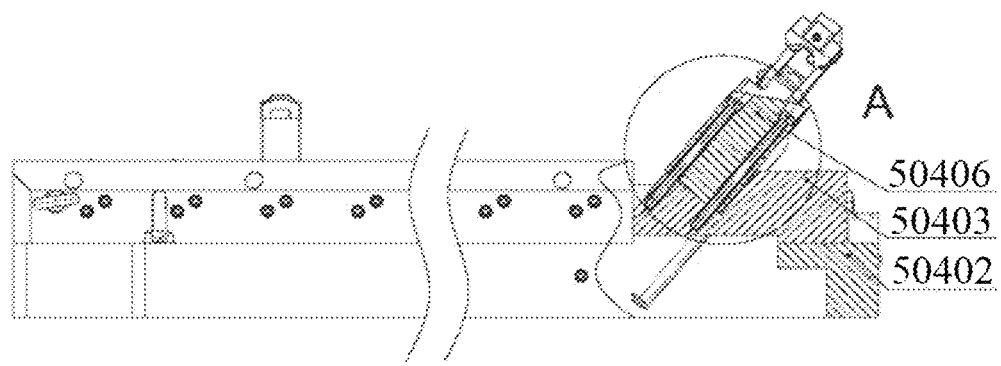
Figure 8I:
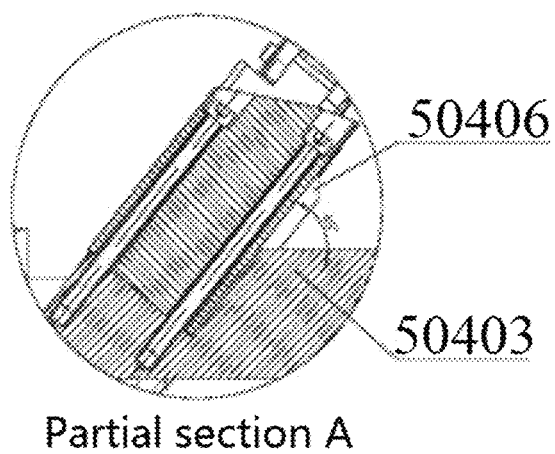

As shown in FIG. 8 to FIG. 8(h), the positioning table 50405 in the multi-station gas detection hydraulic clamp 504 can simultaneously limit the space six-degree-of-freedom of the cutter materials 1 to ensure reliable positioning of the cutter materials. Furthermore, the upper clamping mechanism 50406 and the end face clamping mechanism 50404 which are obliquely mounted at 45 degrees can clamp the cutter materials in all directions. A plurality of gas detection pipelines are further arranged in the multi-station gas detection hydraulic clamp 504. And the gas outlet holes of the gas detection pipelines are uniformly distributed on the positioning table 50405. When the blank cutter materials 1 are in a good positioning and clamping state on the clamp, the gas outlet holes in the positioning table 50405 are blocked by the cutter materials 1, an air pressure is generated in the air detection pipelines, and the machining center 5 analyzes the air pressure in the gas detection pipelines to determine whether the clamp reliably positions and clamps the cutter materials 1 or not. If yes, the machining center starts the main shaft for machining, and if not, the machining center stops working and gives an alarm through a buzzing signal lamp 512. By the multi-station gas detection hydraulic clamp 504, the processing quality of materials can be ensured under the situation of no supervision, and a plurality of stations on the clamp can reliably position and clamp a plurality of cutter materials in a one-to-many manner, thereby improving the production efficiency of the production line and ensuring the production quality of the production line. The tool setting gauge 50401 is further mounted on the multi-station gas detection hydraulic clamp 504. Before machining, the machining center can detect the states of the cutters through the tool setting gauge 50401, if cutter breakage is discovered, the machining center stops working and gives an alarm, and the tool setting gauge is in the prior art.

In order to enable the multi-station gas detection hydraulic clamp 504 to reliably clamp materials, a cutting force of the machining center 5 needs to be calculated, and oil pressure provided by a hydraulic station 510 is adjusted according to the cutting force. According to the exponential formula of the cutting force, through a large number of experiments, the cutting force measured by a dynamometer is processed by a mathematical method so as to obtain an empirical formula for calculating the cutting force. An empirical formula for a milling force is provide as follows, where F is the milling force, $C_P$ is a type coefficient of a milling cutter, $\alpha_P$ is a milling depth, $f_z$ is feed engagement, d is a diameter of the milling cutter, B is a milling width, Z is the number of teeth of the milling cutter and $K_P$ is a correction coefficient;

$$F = C_P a_p^{0.86} f_z^{0.72} d^{-0.86} B \cdot z K_P \tag{1}$$

After the hydraulic pump conveys hydraulic oil to the hydraulic cylinder through a hydraulic pipeline in the system, the hydraulic oil applies pressure to the bottom of the piston rod. The effective contact area between the bottom of the piston rod and the hydraulic oil is S, under the action of the pressure, the upper clamping mechanism clamps the cutter material tightly, $F_1$ is the force applied to the clamping arm 5040604 by the piston rod 5040605, $L_1$ is the linear distance between the axis of the piston rod 5040605 and the axis of a pin shaft positioning hole of the upper clamping arm connecting rod 5040602. $L_2$ is the linear distance between the axis of the pin shaft positioning hole of the upper clamping arm connecting rod 5040602 and the stress point on the V-shaped clamping block 5040403, $F_2$ is the clamping force of the V-shaped clamping block acting on the cutter material. According to a static balance equation below, $$\Sigma M = 0 F_1 L_1 = F_2 L_2 \tag{2}$$

A following formula can be obtained, $$F_1 = F_2 L_2 / L_1 \tag{3}$$

Because the upper clamping mechanism is mounted at 45 degrees, an upper component force $F_1'$ and a lateral component force $F_2'$ of the V-shaped block acting on the cutter material during clamping are as follows:

$$F_1' = F_2' = F_2 \cos 45° \tag{4}$$

From the above analysis, in a clamping critical state of cutter material, $$F = F_1' = F_2' = F_2 \cos 45° \tag{5}$$

$$C_P a_p^{0.86} f_x^{0.72} d^{-0.86} B \cdot z K_p = F_2 \cos 45° \tag{6}$$

Therefore, $$F_2 = C_P a_p^{0.86} f_x^{0.72} d^{-0.86} B \cdot z K_p / \cos 45° \tag{7}$$

F2 is substituted into the formula (3), the following formula can be obtained.

$$F_1 = F_2 L_2 / L_1 = C_P a_p^{0.86} f_x^{0.72} d^{-0.86} B \cdot z K_p \cdot L_2 / L_1 \cdot \cos 45° \quad (8)$$

Therefore, the oil pressure P to be provided by the hydraulic station 510 is at least:

$$P = F_1 \cdot S = C_P a_p^{0.86} f_x^{0.72} d^{-0.86} B \cdot z K_p \cdot L_2 \cdot S / L_1 \cdot \cos 45° \quad (9)$$

S3, after the robot 3 finishes loading and unloading of the three machining centers, the robot 3 enters the procedure S3. The robot 3 exchanges the finished cutter materials 1 on the transfer station 4 with the blank cutter materials in the tray on the material table 2. When the finished cutter materials placed in the tray on the material table 2 reaches a specified quantity, the robot 3 pushes out the tray and notifies the operator to take the materials. Furthermore, the robot 3 pulls back other trays in which the blank cutter materials are placed and starts to work. Through the procedure S3, the material exchange between the machining center 5 and the material table can be converted into a material exchange between the transfer station 3 and the material table, the waiting time of the machining center 3 in the loading and unloading process can be greatly shortened by adopting the logic relation, thereby improving the production efficiency of the production line.

Under the situation that the material source is sufficient, through continuous circulation of the procedures from S1 to S3, the production line can continuously process the blank cutter materials 1 into the finished cutter materials 1.

Figure 9E:
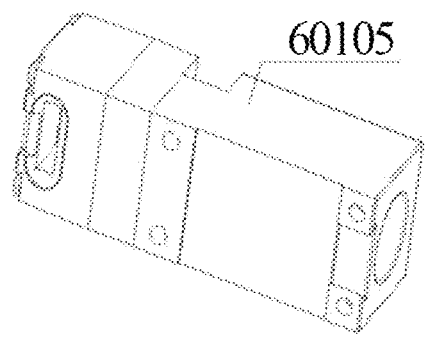
Figure 9F:
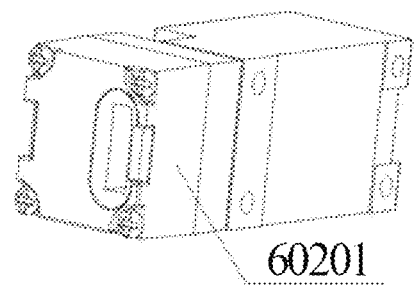
Figure 9G:
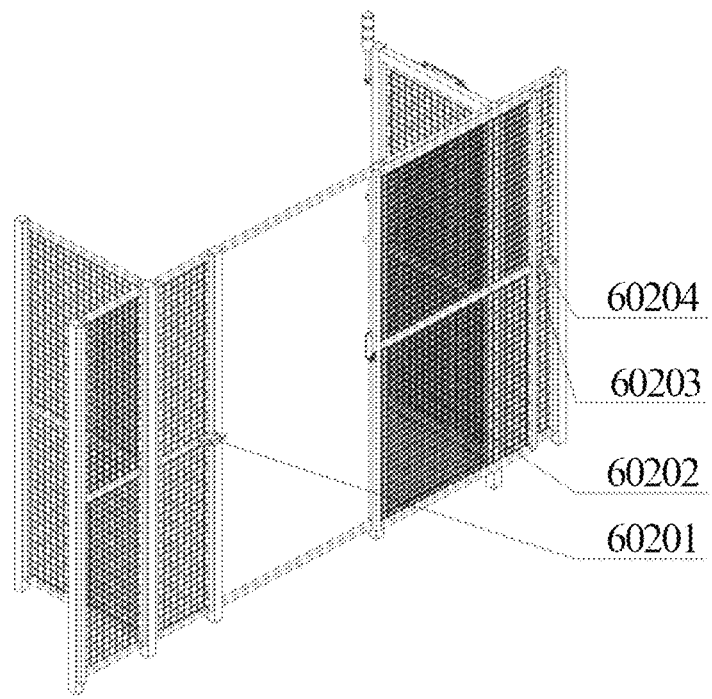

As shown in FIG. 9 to FIG. 9(e), when the robot 3 is working, the operator is likely to be injured by the robot 3 if the operator enters the protective fence. In order to avoid the situation, the three safety doors 601 are all provided with safety door bolts 60106 and safety door sockets 60105. The robot 3 can work only when the three safety doors 601 are all closed, that is, the three safety door bolts 60106 are all inserted into the safety door sockets 60105. As long as one of the three safety doors 601 is opened, the robot 3 stops working immediately, and meanwhile, the buzzing signal lamp 60103 sends out an alarm signal. In view of the facts that the workshop environment is complex and the person flow is large, in order to prevent the safety door 601 from being opened accidentally, the iron plate 60101 and the magnetic lock 60102 are mounted on the safety door 601. After the safety door 601 is closed, the magnetic lock 60102 can absorb the iron plate 60101, and only after the electromagnetic switch 60104 is pressed, the magnetic lock 60102 is powered off and demagnetized, so that the safety door 601 can be opened.

As shown in FIG. 9(e) to FIG. 9(h), when a certain machining center is abnormal (a cutter is broken, the cutter materials are not reliably positioned and clamped and the like), this machining center sends a signal to the robot, and after the robot receives the signal, the robot pauses the current operation and returns to a safe position, and further controls the production line to give an alarm. At the moment, the operator enters the protective fence for maintenance, the operator closes the forbidden doors 602 in front of the abnormal machining center, after the forbidden doors are closed, the forbidden door bolt 60203 is pulled out of the forbidden door socket 60204, and the forbidden door bolt 60202 is inserted into the forbidden door socket 60201. The safety door corresponding to this forbidden door is short-circuited in the circuit, the magnetic lock 60102 on this safety door is powered off, then the operator starts the robot, and at the moment, the robot 3 ignores the abnormal machining center and continues to work on the other machining centers. After the operator completes maintenance for this abnormal machining center, the robot is firstly paused, then the corresponding forbidden door 602 is opened, at the moment, the forbidden door bolt 60204 is inserted into the forbidden door socket 60205, the forbidden door bolt 60203 is pulled out of the forbidden door socket 60202, meanwhile, the safety door corresponding to this forbidden door is connected into a circuit, the magnetic lock 60102 is electrified, then the operator closes the safety door and starts the robot, and at the moment, the robot 3 can recognize that the abnormal machining center has been maintained, and perform operations on the maintained machining center.

The foregoing descriptions are merely exemplary embodiments of the present disclosure, but are not intended to limit the present disclosure, and for the skill in the art, the present disclosure can be of various modifications and changes. Any modification, equivalent replacement, or improvement made without departing from the spirit and principle of the present disclosure shall fall within the protection scope of the disclosure.

What is claimed is:

1. A production line for machining workpiece blanks, the production line comprising:
   a robot;
   material tables, each of the material tables comprising a respective material table base body and a respective plurality of trays, each of the trays being configured to receive a respective plurality of the workpiece blanks;
   a plurality of machining centers for clamping and machining the workpiece blanks;
   a protective fence surrounding the robot;
   wherein the material tables and the machining centers are arrayed about the robot such that the machining centers are outside the protective fence,
   wherein a respective transfer station for selectively receiving workpiece blanks from the robot and machined workpieces from the robot is arranged outside the protective fence and between each of the machining centers and the robot,
   wherein the protective fence is arranged to extend directly above the material tables such that part of each of the material tables is outside of the protective fence, and such that part of each of the material tables is inside of the protective fence;
   wherein the robot is provided with a mechanical arm, the mechanical arm comprises at least one clamping jaw, wherein the robot is configured to provide workpiece blanks to each of the machining centers; and
   wherein the trays are each driven so as to be slidable beneath the protective fence and relative to the corresponding material table base body so as to enable the workpiece blanks thereon to be moved from outside the protective fence to inside the protective fence where the workpiece blanks inside the protective fence can be picked up via the at least one clamping jaw.

2. The production line according to claim 1,
   wherein the protective fence is rectangular, the robot is located at a center position of the protective fence, the plurality of machining centers comprises three machining centers, and the material tables and the three machining centers are annularly and uniformly arranged along a circumferential direction with the robot as a circle center; and wherein the protective fence comprises three forbidden doors, each of the forbidden doors comprises a respective opening and closing door which is openable, each of the opening and closing doors is engaged with a respective forbidden door socket fixed to the corresponding forbidden door via a respective forbidden door bolt to achieve opening and closing of the corresponding opening and closing door, wherein six safety doors are provided, comprising three fixed doors and three openable doors, wherein a respective one of the fixed doors is provided on a respective one side of each of the opening and closing doors of the three forbidden doors, and a respective one of the openable doors is provided on a respective opposite side of each of the opening and closing doors of the three forbidden doors, wherein a respective two of the safety doors are arranged on each of three sides of the protective fence.

3. The production line according to claim 1, wherein the mechanical arm is further provided with a base plate on which the at least one clamping jaw is provided, wherein an air nozzle is provided on the base plate for spraying pressurized gas, and an orientation of the air nozzle is the same as an orientation of a part of the at least one clamping jaw;

wherein a laser detecting unit for detecting the workpiece blanks is mounted on the base plate, and the laser detecting unit comprises a laser detector fixed to a bottom mounting plate, the bottom mounting plate is connected with a dustproof end cover via a pin shaft, a first linear moving mechanism is arranged on a side of the laser detector and connected with an ejector rod, the ejector rod is arranged on an inner side of the dustproof end cover, and the ejector rod is configured to extend out to open the dustproof end cover.

4. The production line according to claim 3, wherein a seal cover with a U-shaped cross section is arranged on an outer side of the laser detector, and a respective reset spring is arranged at each of two sides of the dustproof end cover so as to extend between the dustproof end cover and a side portion of the first linear moving mechanism.

5. The production line according to claim 1, wherein each of the material table base bodies supports a respective upper-layer tray push-pull module and a respective lower-layer tray push-pull module, wherein for each of the material tables, the corresponding upper-layer tray push-pull module is higher than the corresponding lower-layer tray push-pull module, and wherein for each of the material tables, the corresponding upper-layer tray push-pull module and the corresponding lower-layer tray push-pull module are movable in a staggered manner; and wherein for each of the material tables, the corresponding plurality of trays comprises a respective upper-layer tray and a respective lower-layer tray, wherein for each of the material tables, the corresponding upper-layer tray push-pull module comprises a corresponding one of the upper-layer trays, wherein each of the upper-layer trays is fixed to a corresponding upper-layer supporting plate, wherein each of two sides of each of the upper-layer supporting plates is fixed to a respective sliding block for sliding along a respective guide rail via a respective upper-layer connecting block, wherein each of the upper-layer tray push-pull modules comprises a respective second linear moving mechanism arranged on a side portion of one of the corresponding guide rails, wherein for each of the upper-layer tray push-pull modules, the corresponding guide rails are supported via an upper-layer tray push-pull module frame which is provided with buffer cylinders such that a respective one of the buffer cylinders is provided at an end of each of the guide rails, and wherein for each of the upper-layer tray push-pull modules, a respective proximity sensor is arranged on a side of the corresponding second linear moving mechanism so as to transmit position information of the upper-layer tray to a computer.

6. The production line according to claim 5, wherein each of the lower-layer tray push-pull modules comprises a corresponding one of the lower-layer trays, wherein each of the lower-layer trays is fixed to a corresponding lower-layer supporting plate, wherein each of the lower-layer supporting plates is fixed via a respective plurality of lower-layer connecting blocks to a corresponding plurality of lower-layer sliding blocks, each of the lower-layer sliding blocks being configured for sliding on a respective lower-layer guide rail, a respective lower surface of each of the lower-layer supporting plates is connected with a respective third linear moving mechanism via a respective connecting piece, each of the third linear moving mechanisms is arranged below a corresponding one of the lower-layer supporting plates, each of the third linear moving mechanisms is located between a corresponding two of the lower-layer guide rails and below the corresponding lower-layer tray, wherein each of the lower-layer tray push-pull modules comprises a respective lower-layer tray push-pull module frame, and wherein for each of the lower-layer tray push-pull modules, the corresponding lower-layer guide rails are supported via one of the lower-layer tray push-pull module frames, and wherein each of the lower-layer tray push-pull module frames is provided with lower-layer buffer cylinders such that a respective one of the lower-layer buffer cylinders is provided at an end of each of the lower-layer guide rails;

each of the connecting pieces comprises a respective T-shaped connecting plate connected with the corresponding lower-layer supporting plate and each of the connecting pieces also comprises a respective U-shaped connecting plate connected to the corresponding T-shaped connecting plate, wherein each of the third linear moving mechanisms has a respective piston rod, and wherein for each of the lower-layer tray push-pull modules, the corresponding connecting pieces are fixed to the corresponding piston rod of the corresponding third linear moving mechanism; and a respective proximity sensor is arranged on a respective side of each of the third linear moving mechanisms so as to transmit position information of the corresponding lower-layer tray to the computer.

7. The production line according to claim 6, wherein each of the transfer stations comprises a respective transfer station base body and a respective transfer tray, and wherein a respective plurality of supporting plates, including supporting plates of differing heights, are arranged on an upper surface of each of the transfer station base bodies, and wherein each of the transfer trays is obliquely arranged relative to a horizontal direction via the corresponding plurality of supporting plates; and wherein a respective plurality of material positioning grooves is formed in each of the upper-layer trays, in each of the lower-layer trays, and in each of the transfer trays, wherein each of the material positioning grooves are arranged in a stepped manner so as to enable the receipt thereby of workpiece blanks of varying specifications.

8. The production line according to claim 6, wherein each of the machining centers is provided with a respective multi-station gas detection hydraulic clamp, wherein each of the multi-station gas detection hydraulic clamps comprises a respective clamp base plate, a respective tool setting gauge is arranged on a respective side of each of the clamp base plates, a respective supporting plate is fixed to a respective one of each of the base plates, and each of the supporting plates is provided with a respective plurality of positioning tables, and a respective end face clamping mechanism and a respective upper clamping mechanism are mounted on each of the positioning tables; and wherein each of the multi-station gas detection hydraulic clamps is connected with the computer and is further connected with a respective foot switch arranged on a ground, and an operator manually opens and closes the corresponding multi-station gas detection hydraulic clamp through the corresponding foot switch arranged on the ground.

9. The production line according to claim 1, wherein each of the machining centers is a respective machine tool, wherein each of the machine tools is provided with a respective plurality of protective doors, wherein each protective door of each of the pluralities of protective doors is movable between a respective two extreme positions, wherein a respective plurality of proximity sensors is provided for each of the protective doors such that one of the proximity sensors is arranged at each of the extreme positions, and wherein each protective door of each of the pluralities of protective doors is connected with a respective linear moving mechanism.

* * * * *